(12) United States Patent
Ikuta et al.

(10) Patent No.: US 11,478,915 B2
(45) Date of Patent: Oct. 25, 2022

(54) WORK TOOL

(71) Applicant: MAKITA CORPORATION, Anjo (JP)

(72) Inventors: Hiroki Ikuta, Anjo (JP); Akira Mizutani, Anjo (JP)

(73) Assignee: MAKITA CORPORATION, Anjo (JP)

( * ) Notice: Subject to any disclaimer, the term of this patent is extended or adjusted under 35 U.S.C. 154(b) by 297 days.

(21) Appl. No.: 16/794,512

(22) Filed: Feb. 19, 2020

(65) Prior Publication Data
US 2020/0282539 A1 Sep. 10, 2020

(30) Foreign Application Priority Data

Mar. 4, 2019 (JP) .............................. JP2019-038938
Nov. 21, 2019 (JP) .............................. JP2019-210855

(51) Int. Cl.
*B25F 3/00* (2006.01)
*B25F 5/02* (2006.01)
*B24B 23/04* (2006.01)
*B23D 61/00* (2006.01)

(52) U.S. Cl.
CPC ................. *B25F 3/00* (2013.01); *B25F 5/02* (2013.01); *B23D 61/006* (2013.01); *B24B 23/04* (2013.01)

(58) Field of Classification Search
CPC ..................................... B25F 3/00; B25F 5/02
See application file for complete search history.

(56) References Cited

U.S. PATENT DOCUMENTS

| | | | | |
|---|---|---|---|---|
| 5,175,963 A | * | 1/1993 | Schafer | B24B 45/006 451/342 |
| 5,489,285 A | * | 2/1996 | Gohs | B23D 51/10 D24/146 |
| 9,339,927 B2 | * | 5/2016 | Xu | B27B 5/30 |
| 2007/0060030 A1 | * | 3/2007 | Pollak | B27B 5/32 451/359 |
| 2013/0082449 A1 | * | 4/2013 | Bernardi | B24B 23/022 279/141 |
| 2015/0042052 A1 | * | 2/2015 | Furusawa | B24B 23/04 279/141 |

(Continued)

FOREIGN PATENT DOCUMENTS

JP 2017-039178 A 2/2017

*Primary Examiner* — Nathaniel C Chukwurah
*Assistant Examiner* — Lucas E. A. Palmer
(74) *Attorney, Agent, or Firm* — Oliff PLC

(57) ABSTRACT

A work tool includes a housing, a spindle, a clamp shaft, a biasing member, an operation member, a motion-converting mechanism and a pushing-down member. The spindle is supported to be rotatable around a driving axis. The clamp shaft is movable in the up-down direction relative to the spindle. The biasing member is configured to bias the clamp shaft upward relative to the spindle so as to apply to the clamp shaft a clamping force for clamping a tool accessory between a head part of the clamp shaft and a lower end portion of the spindle. The motion-converting mechanism is configured to move the pushing-down member in the up-down direction along with turning of the operation member around the driving axis. The pushing-down member is configured to be moved downward so as to push the tool accessory downward when the operation member is turned in a first direction.

20 Claims, 20 Drawing Sheets

(56) References Cited

U.S. PATENT DOCUMENTS

2016/0184956 A1* 6/2016 Klabunde ............. B24B 23/022
  279/4.01
2017/0050292 A1* 2/2017 Aoki ..................... B24B 23/022
2017/0282329 A1* 10/2017 Bernardi ................... B27B 5/32

* cited by examiner

WORK TOOL

CROSS-REFERENCE TO RELATED APPLICATION

The present application claims priority to Japanese patent applications No. 2019-038938 filed on Mar. 4, 2019 and No. 2019-210855 filed on Nov. 21, 2019. The contents of foregoing applications are fully incorporated herein by reference.

TECHNICAL FIELD

The present invention relates to a work tool which is configured to perform a processing operation on a workpiece by driving a tool accessory in an oscillating manner.

BACKGROUND ART

A work tool (so-called oscillating tool) is known which is configured to perform a processing operation on a workpiece by oscillatorily driving a tool accessory mounted to a spindle within a specified angle range. The tool accessory may be clamped, for example, between a lower end portion of a spindle and a lower end portion of a clamp shaft which is coaxially arranged with the spindle and biased upward relative to the spindle (see, for example, Japanese non-examined laid-open patent publication No. 2017-39178).

SUMMARY

In a clamp-type oscillating tool as described above, when the tool accessory is oscillatorily driven while being firmly pressed against the spindle, the tool accessory may be stuck to the lower end portion of the spindle, which may make it difficult to remove the tool accessory. Therefore, such an oscillating tool has room for improvement in removal of the tool accessory.

Accordingly, it is an object of the present disclosure to provide a technique that may contribute to easy removal of a tool accessory in a work tool which is configured to drive the tool accessory in an oscillating manner.

The present disclosure provides a work tool which is configured to perform a processing operation on a workpiece by driving a tool accessory in an oscillating manner. The work tool includes a housing, a spindle, a clamp shaft, a biasing member, an operation member, a motion-converting mechanism and a pushing-down member.

The spindle is cylindrically formed and supported by the housing so as to be rotatable around a driving axis. The driving axis defines an up-down direction of the work tool. The clamp shaft is configured to be movable in the up-down direction relative to the spindle. The clamp shaft has a shaft part and a head part. The shaft part extends coaxially with the spindle within the spindle. The head part is connected to a lower end of the shaft part. The biasing member is configured to bias the clamp shaft upward relative to the spindle so as to apply to the clamp shaft a clamping force for clamping the tool accessory between the head part and a lower end portion of the spindle. The operation member is configured to be turned around the driving axis by a user's external operation. The motion-converting mechanism is configured to convert rotational motion around the driving axis into linear motion along the driving axis. The pushing-down member is disposed to be movable at least in the up-down direction relative to the spindle. The motion-converting mechanism is configured to move the pushing-down member in the up-down direction along with turning of the operation member around the driving axis. The pushing-down member is configured to be moved downward so as to push the tool accessory downward when the operation member is turned in a first direction.

DETAILED DESCRIPTION OF THE EMBODIMENTS

Figure 1:
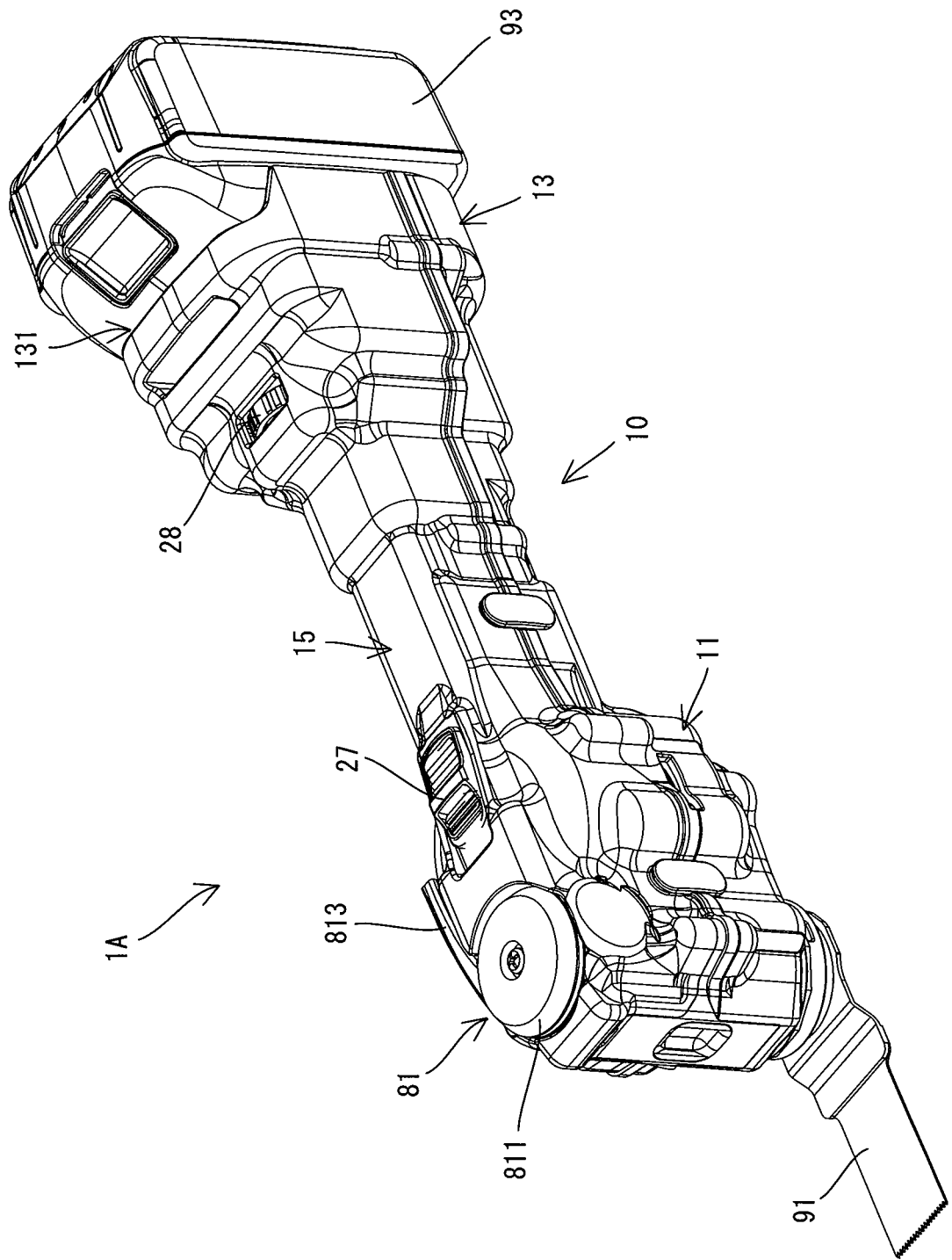
FIG. 1 is a perspective view showing a whole oscillating tool when a rotary lever is placed in an initial position.

Embodiments are described below with reference to the drawings.

First Embodiment

An oscillating tool 1A according to a first embodiment is now described. The oscillating tool 1A is an example of an electric work tool which is configured to perform a processing operation on a workpiece (not shown) by driving a tool accessory 91 in an oscillating manner (see FIG. 1). Plural kinds of tool accessories such as a blade, a scraper, a grinding pad and a polishing pad are available as the tool accessory 91 which can be mounted to the oscillating tool 1A. In order to perform a desired operation, a user may select one of the tool accessories 91 which is suitable for the desired operation such as cutting, scraping, grinding and polishing, and attach the tool accessory 91 to the oscillating tool 1A. In the drawings referenced below, a blade attached to the oscillating tool 1A is shown as an example of the tool accessory 91.

Figure 2:
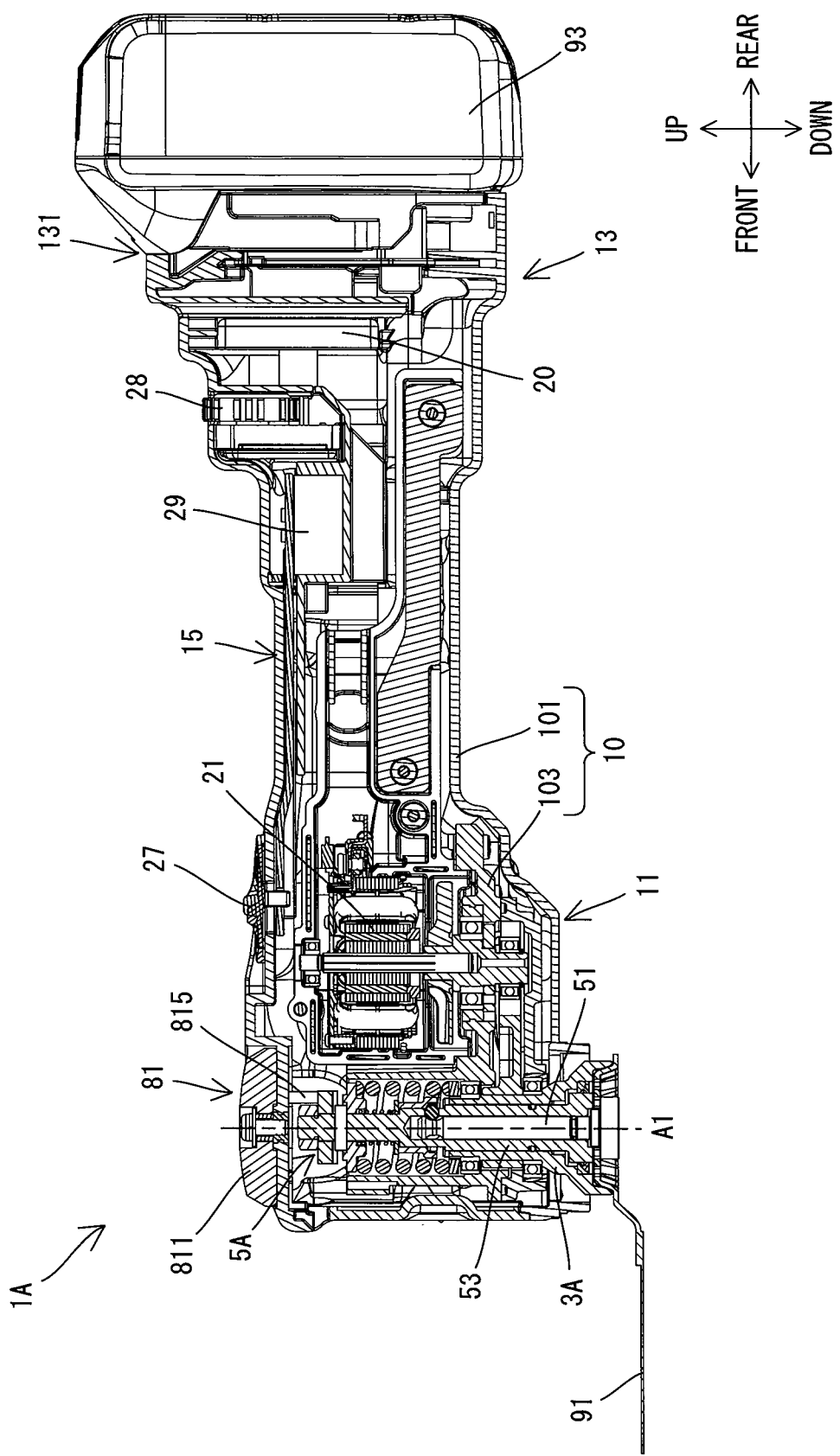
FIG. 2 is a sectional view showing the oscillating tool when the rotary lever is placed in the initial position.

First, a general structure of the oscillating tool 1A is described. As shown in FIGS. 1 and 2, the oscillating tool 1A has an elongate housing (also referred to as a tool body) 10. A spindle 3A and a motor 21 are housed within one end portion in a longitudinal direction of the housing 10. The spindle 3A is arranged along a driving axis A1 which intersects (specifically, which substantially orthogonally intersects) a longitudinal axis of the housing 10. One end portion (an axial end portion) of the spindle 3A in a direction of the driving axis A1 (also referred to as a driving-axis-A1 direction) protrudes from the housing 10 and is exposed to the outside. The tool accessory 91 can be removably mounted to this exposed portion. Further, a battery 93 for supplying electric power to the motor 21 can be removably mounted to the other end portion in the longitudinal direction of the housing 10. A central portion of the housing 10 in the longitudinal direction has a cylindrical shape having a smaller diameter than the both end portions of the housing 10, and forms a grip part 15 to be held by the user. The oscillating tool 1A is configured to reciprocally rotate the spindle 3A within a specified angle range around the driving axis A1 by power of the motor 21 and thereby oscillate the tool accessory 91 within the specified angle range in an oscillation plane, which is orthogonal to the driving axis A1.

In the following description, for convenience sake, relating to the directions of the oscillating tool 1A, the driving-axis-A1 direction is defined as an up-down direction. In the up-down direction, the side of one end portion of the spindle 3A to which the tool accessory 91 may be mounted is defined as a lower side, while the opposite side is defined as an upper side. A direction which is orthogonal to the driving axis A1 and which corresponds to an extending direction of the housing 10 (specifically, the longitudinal direction of the housing 10) is defined as a front-rear direction. In the front-rear direction, the side of one end portion of the housing 10 in which the spindle 3A is housed is defined as a front side, while the side of the other end portion on which the battery 93 may be mounted is defined as a rear side. Further, a direction which is orthogonal to the up-down direction and the front-rear direction is defined as a left-right direction.

A detailed structure of the oscillating tool 1A is now described.

First, the housing 10 is described. As shown in FIG. 2, the housing 10 of the present embodiment is configured as a so-called vibration-isolating housing, and includes an outer housing 101 and an inner housing 103. The outer housing 101 is an elongate hollow body extending in the front-rear direction and forms an outer shell of the oscillating tool 1A. The inner housing 103 is an elongate hollow body extending in the front-rear direction and is housed within the outer housing 101. The inner housing 103 houses the motor 21, and the spindle 3A. Although not shown in detail, the outer housing 101 is connected to the inner housing 103 via a plurality of elastic members so as to be movable in the front-rear, left-right and up-down directions relative to the inner housing 103.

As shown in FIG. 1, a rotary lever 81 is provided on a top of a front end part 11 of the housing 10 (the outer housing 101). The rotary lever 81 is configured as an operation member for clamping and unclamping the tool accessory 91 with a clamp mechanism 5A described below (see FIG. 3). The rotary lever 81 is arranged to be turned around the driving axis A1 by a user's turning operation. In the present embodiment, the rotary lever 81 includes a fixed part 811 and a lever 813. The fixed part 811 has a dis-like shape and is supported by the housing 10 so as to be rotatable around the driving axis A1 (see FIG. 2). The lever 813 extends substantially in a tangential direction from the fixed part 811. Further, a pair of projections 815 protrude downward from a lower end of the fixed part 811 (see FIG. 5). The projections 815 are symmetrically arranged relative to the driving axis A1 and configured to rotate an intermediate shaft 53, which will be described below, along with turning (rotary movement) of the rotary lever 81.

As shown in FIG. 1, in the present embodiment, when the rotary lever 81 is in an initial position, the lever 813 abuts on a right side of the front end part 11. The rotary lever 81 can be turned approximately 120 degrees in a counterclockwise direction when viewed from above (in a direction in which the lever 813 is moved apart from the right side of the front end part 11 (from the initial position). The tool accessory 91 can be unclamped by turning the rotary lever 81 in the counterclockwise direction when viewed from above, which will be described below in detail, and accordingly, this direction is also referred to as a release direction in the following description. On the other hand, a clockwise direction of the rotary lever 81 when viewed from above is also referred to as a clamp direction. Coordinated movement of the rotary lever 81 and the clamp mechanism 5A will be described below.

A slider 27 is provided on a top of a boundary region between the front end part 11 and the grip part 15 of the housing 10 (behind the rotary lever 81). The slider 27 is disposed to slide in the front-rear direction according to a user's operation and configured as an operation member for turning on and off a switch 29 (see FIG. 2) which is housed within the grip part 15. A rotary-type speed change dial 28 for steplessly setting the rotation speed of the motor 21 is disposed in an upper portion of a rear end part 13 so as to be externally operated.

The internal structure of the housing 10 is now described.

As shown in FIG. 2, a battery-mounting part 131 is provided in the rear end part 13 of the housing 10 (specifically, the outer housing 101). The battery-mounting part 131 is configured such the battery 93 is removably mounted thereto. The battery-mounting part 131 has a engagement structure which slidably engages with the rechargeable battery 93, and a terminal for connection to a terminal of the battery 93. The structures of the battery-mounting part 131 and the battery 93 are well known and therefore not described herein. A controller 20 for controlling driving of the motor 21 is housed within the rear end part 13 of the housing 10 (specifically, the outer housing 101). In the present embodiment, the controller 20 is configured to drive the motor 21 at a rotation speed set with the speed change dial 28 when the switch 29 is turned on.

Figure 3:
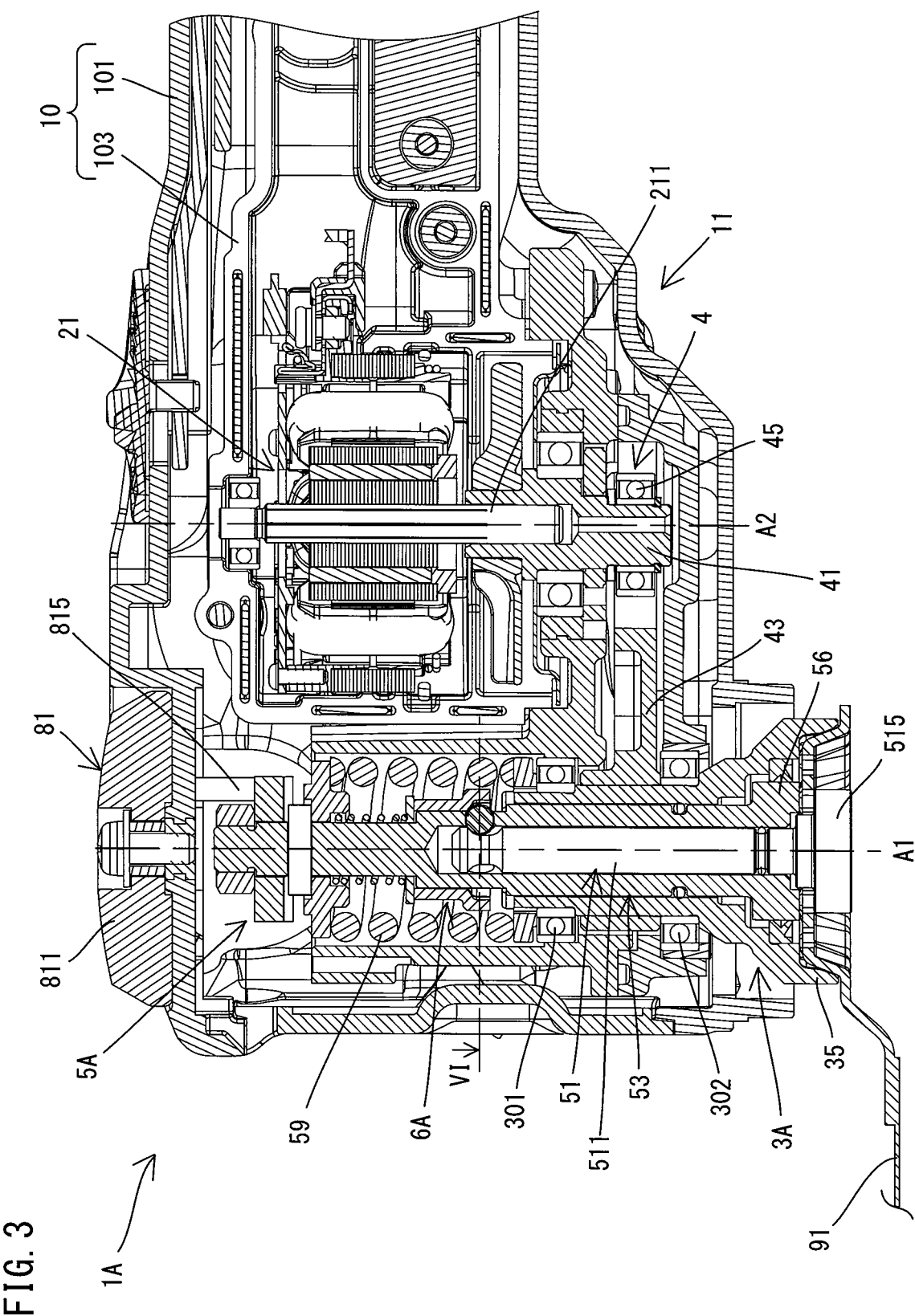
FIG. 3 is a partial, enlarged view of FIG. 2.

As shown in FIG. 3, the spindle 3A, the motor 21, a transmitting mechanism 4 and the clamp mechanism 5A are housed in the front end part 11 of the housing 10 (specifically, the inner housing 103). These structures are now described in this order.

Figure 4:
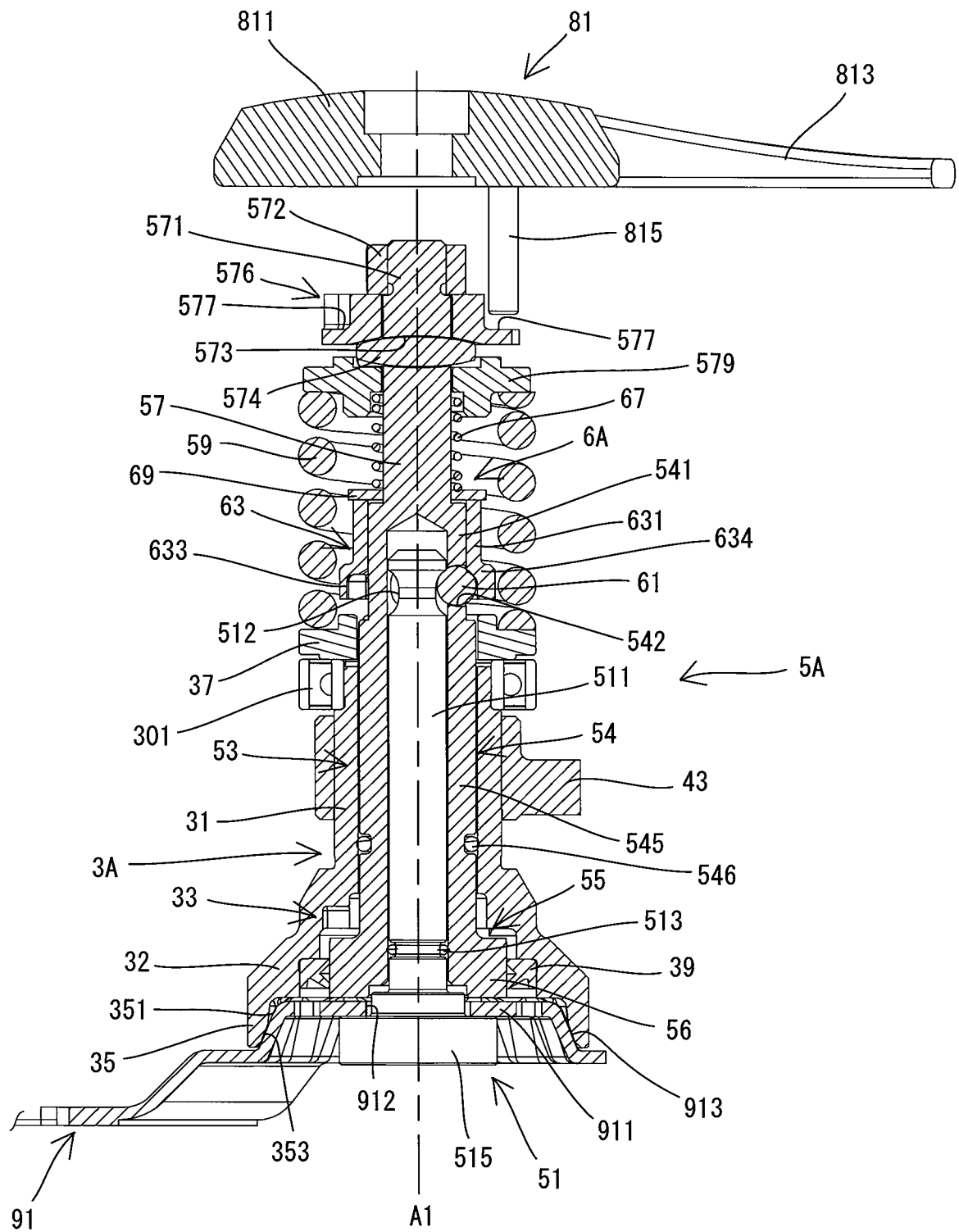
FIG. 4 is a sectional view (a section passing through the center of a ball and a driving axis which are shown in FIG. 3) of a spindle, a clamp mechanism and the rotary lever when the rotary lever is placed in the initial position.
Figure 5:
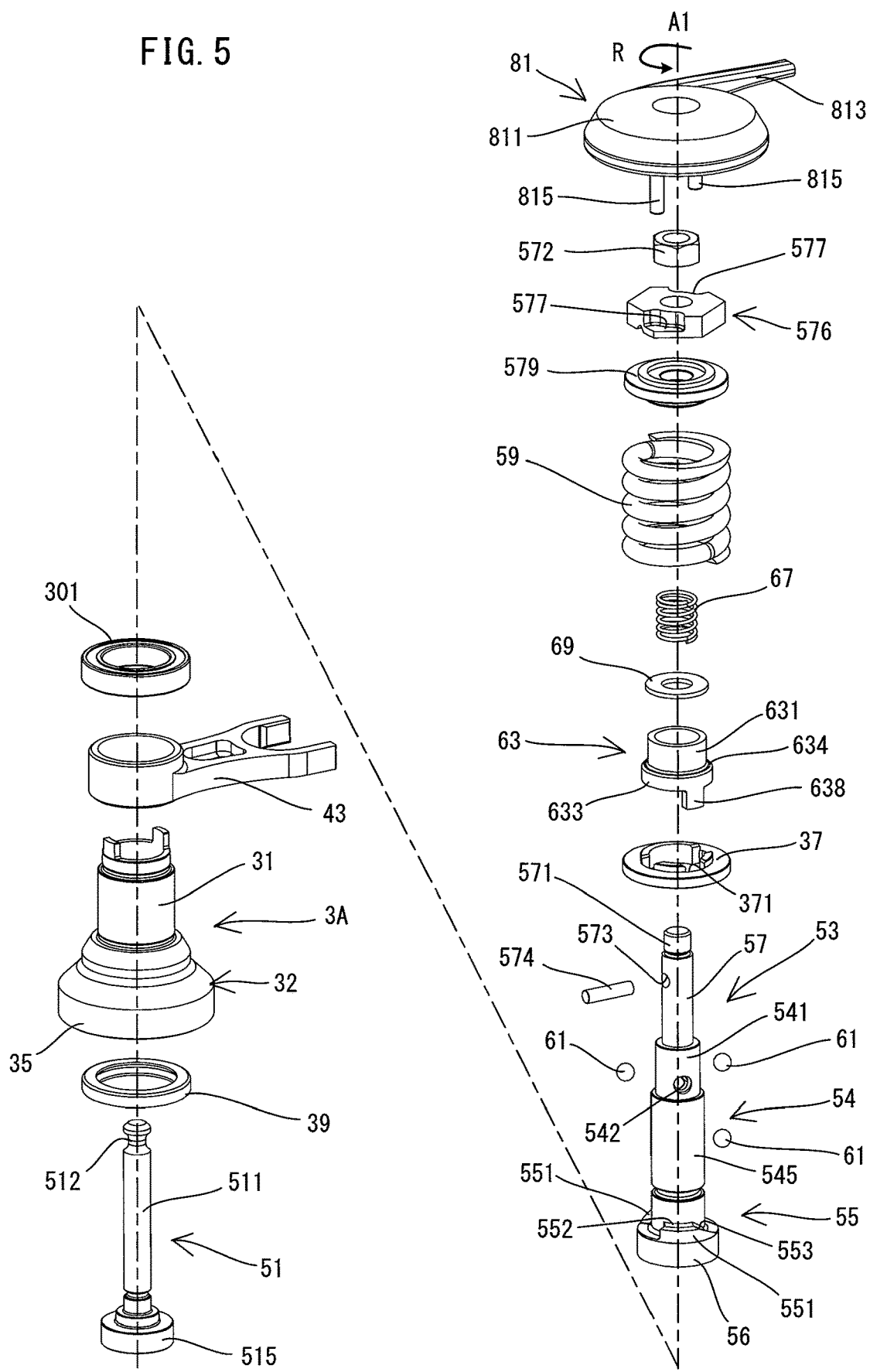
FIG. 5 is an exploded perspective view showing the spindle, the clamp mechanism and the rotary lever.

As shown in FIG. 3, in a lower portion of the front end part 11, the spindle 3A is supported rotatably around the driving axis A1 by two bearings 301 and 302 held by the housing 10 (the inner housing 103). As shown in FIGS. 4 and 5, the spindle 3A is an elongate circular cylindrical member. In the present embodiment, the spindle 3A includes a circular cylindrical part 31 and a flange part 32 which are integrally formed.

The cylindrical part 31 is a portion of the spindle 3A which has a circular cylindrical shape having a uniform inner diameter. The cylindrical part 31 extends along the driving axis A1 in the up-down direction. An intermediate shaft 53 is inserted through the cylindrical part 31. The bearings 301 and 302 support upper and lower end portions of the cylindrical part 31, respectively.

The flange part 32 is a flange-like portion which is connected to a lower end of the cylindrical part 31. A lower end portion of the flange part 32 is configured as a tool-mounting part 35 to which the tool accessory 91 may be mounted. The tool-mounting part 35 has a recess 351 recessed upward. A surface of the recess 351 which defines the recess 351 (an inner peripheral surface of the tool-mounting part 35) includes an inclined face 353 which is inclined downward in a direction away from the driving axis A1 (radially outward). Each of the tool accessories 91 (such as a blade, a scraper, a grinding pad and a polishing pad) which can be mounted to the oscillating tool 1A has a protruding part 911 which can be fitted in the recess 351 of the tool-mounting part 35. A through hole 912 is formed in a central portion of the protruding part 911 such that a shaft part 511 of a clamp shaft 51 can be inserted therethrough. Further, a portion of an upper surface of the protruding part 911 which defines the protruding part 911 is configured as an inclined face 913 conforming to the inclined face 353. In the present embodiment, the tool accessory 91 may be clamped between the tool-mounting part 35 and a head part 515 of the clamp shaft 51, with the inclined face 913 in abutment with the inclined face 353, and thereby fixed to the spindle 3A. Fixing the tool accessory 91 to the spindle 3A will be described below in detail.

As shown in FIG. 4, a first cam part 33 is provided on an inner side of an upper end portion of the flange part 32. The first cam part 33 is configured to cause an intermediate shaft 53 to move in the up-down direction relative to the spindle 3A, in cooperation with a second cam part 55 of the intermediate shaft 53, along with rotation of the intermediate shaft 53. The structure of the first cam part 33 will be described below in detail.

A sealing member 39 is fitted into the flange part 32. More specifically, the sealing member 39 is fitted into a portion of the flange part 32 between the tool-mounting part 35 and the first cam part 33 (i.e. above the recess 351). A flange part 56 of the intermediate shaft 53 is slidably inserted through the sealing member 39. In the present embodiment, the sealing member 39 is an oil seal which can prevent a lubricant for lubricating sliding faces of the first cam part 33 and the second cam part 55 from leaking to the outside from between the tool-mounting part 35 and the intermediate shaft 53. The sealing member 39 can also prevent entry of foreign matters such as dust from the outside.

As shown in FIG. 3, the motor 21 as a driving source includes a stator, a rotor and an output shaft 211 which extends from the rotor and rotates together with the rotor. The motor 21 is arranged such that a rotation axis A2 of the output shaft 211 extends in parallel to the driving axis A1 of the spindle 3A (i.e. in the up-down direction). The output shaft 211 protrudes downward from the rotor. In the present embodiment, a brushless direct current (DC) motor is adopted as the motor 21.

The transmitting mechanism 4 is configured to transmit rotation of the motor shaft 211 to the spindle 3A and reciprocally rotate the spindle 3A within the specified angle range around the driving axis A1. As shown in FIG. 3, the transmitting mechanism 4 includes an eccentric shaft 41, an oscillating arm 43 and a bearing 45. The eccentric shaft 41 is coaxially connected to the output shaft 211 below a body (the stator and the rotor) of the motor 21. The eccentric shaft 41 has an eccentric part which is eccentric to the rotation axis A2. The bearing 45 is mounted onto an outer periphery of the eccentric part. The oscillating arm 43 is configured to connect the bearing 45 and the spindle 3A. One end portion of the oscillating arm 43 is annularly formed (see FIG. 5) and fixed onto an outer periphery of the spindle 3A (specifically, the cylindrical part 31) between the bearings 301 and 302. The other end portion of the oscillating arm 43 is bifurcated (see FIG. 5) and arranged to abut on an outer periphery of an outer race of the bearing 45 from the left and right.

The eccentric shaft 41 rotates together with the output shaft 211 when the motor 21 is driven. As the eccentric shaft 41 rotates, the center of the eccentric part moves around the rotation axis A2 and thus the bearing 45 also moves around the rotation axis A2, which causes the oscillating arm 43 to oscillate around the spindle 3A within a specified angle range. As the oscillating arm 43 oscillates, the spindle 3A reciprocally rotates around the driving axis A1 within the specified angle range since the annular end portion of the oscillating arm 43 is fixed onto the spindle 3A. Consequently, the tool accessory 91 fixed to the spindle 3A (more specifically, the tool-mounting part 35) is driven in the oscillating manner so that a processing operation can be performed.

The clamp mechanism 5A is configured to press the tool accessory 91 upward against the tool-mounting part 35 to thereby fix the tool accessory 91 to the tool-mounting part 35 so as to be rotatable together with the spindle 3A. As shown in FIG. 3, in the present embodiment, the clamp mechanism 5A includes the clamp shaft 51, the intermediate shaft 53, a clamp spring 59 and a lock mechanism 6A. The structures of these components are now described in this order.

First, the clamp shaft 51 is described. The clamp shaft 51 is an elongate member which may be inserted into the spindle 3A to fix the tool accessory 91 to the spindle 3A. In the present embodiment, the clamp shaft 51 is configured to be removable from the spindle 3A. As shown in FIGS. 4 and 5, the clamp shaft 51 includes the shaft part 511 and the head part 515 which are integrally formed.

The shaft part 511 is an elongate round rod-like (circular columnar) portion. The shaft part 511 may be disposed coaxially with the spindle 3A within the spindle 3A (more specifically, within the intermediate shaft 53 described below) and extend in the up-down direction. An annular engagement groove 512 having a generally semi-circular section is formed in an upper end portion of the shaft part 511. Balls 61 can be engaged with the engagement groove 512. Further, an annular elastic member (also referred to as an O-ring) 513 is fitted in an annular groove formed in a lower end portion of the shaft part 511. The head part 515 is a portion which connects to a lower end of the shaft part 511 and has a larger diameter than the shaft part 511. The head part 515 is a portion which may abut on the tool accessory 91 from below and press the tool accessory 91 against the tool-mounting part 35. Although the head part 515 has a circular columnar shape in the present embodiment, it may be shaped otherwise.

The intermediate shaft 53 is now described. As shown in FIG. 3, the intermediate shaft 53 is coaxially arranged with the spindle 3A to extend in the up-down direction and configured to hold the clamp shaft 51. Further, the intermediate shaft 53 is disposed to be rotatable around the driving axis A1 and to be movable in the up-down direction, relative to the spindle 3A. In the present embodiment, the intermediate shaft 53 is configured as an elongate member, and inserted through the spindle 3A and supported by the housing 10 (specifically, the inner housing 103) via the spindle 3A.

As shown in FIGS. 4 and 5, the intermediate shaft 53 includes a cylindrical lower part 54 and a round rod-like upper part 57 which are integrally formed.

The shaft part 511 of the clamp shaft 51 may be inserted into the lower part 54. The inner diameter of the lower part 54 is generally equal to the diameter of the shaft part 511 (except for the engagement groove 512). Further, the axial length of the lower part 54 is longer than that of the spindle 3A, and an upper end portion (a lock part 541 to be described below) of the lower part 54 protrudes upward from an upper end of the spindle 3A. The lower part 54 includes the lock part 541, a sliding part 545 and a flange part 56.

Figure 6:
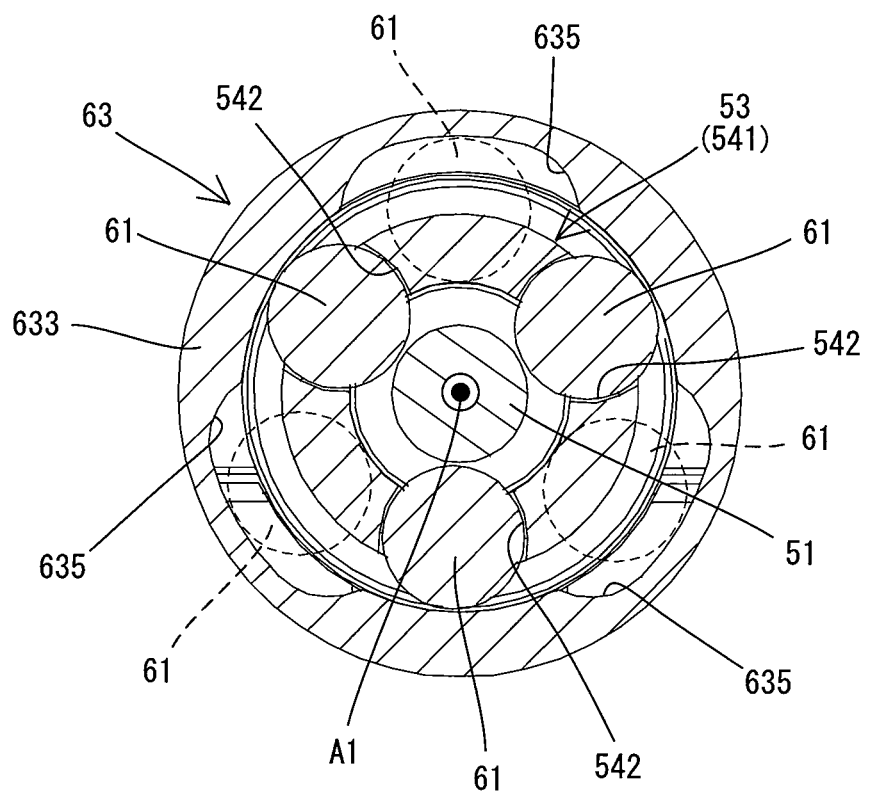
FIG. 6 is a sectional view taken along line VI-VI in FIG. 2 (showing only a clamp shaft, an intermediate shaft, a ball and a lock sleeve).

The lock part 541 is an upper end portion of the lower part 54. An upper end portion of the shaft part 511 including the engagement groove 512 is located in the lock part 541 when the shaft part 511 is inserted into the lower part 54 to the maximum extent. As shown in FIG. 6, the lock part 541 has three ball-holding holes 542 each configured to hold the ball 61 so as to be movable in a radial direction. The ball-holding hole 542 is configured to allow the ball 61 to partly protrude inward (toward the driving axis A1) of an inner peripheral surface of the lock part 541 (an innermost end of the ball-holding hole 542), while not allowing the ball 61 to come off inward from the ball-holding hole 542, when the ball 61 is located in an innermost position in the radial direction within its movable range. Further, the ball 61 partly protrudes outward of an outer peripheral surface of the lock part 541 when the ball 61 is located in the innermost position in the radial direction.

As shown in FIG. 4, the sliding part 545 is a portion which extends downward from a lower end of the lock part 541. The sliding part 545 is slidably disposed within the spindle 3A and has an outer diameter generally equal to the inner diameter of the cylindrical part 31. Further, the outer diameter of the sliding part 545 is larger than that of the lock part 541. An annular elastic member (also referred to as an O-ring) 546 is fitted in an annular groove formed in an outer periphery of the sliding part 545. A lubricant is sealed in between the elastic member 546 and the above-described sealing member 39 to ensure smooth sliding movement of the first and second cam parts 33 and 55.

As shown in FIGS. 4 and 5, the flange part 56 is a flange-like portion which is connected to a lower end of the sliding part 545, and forms a lower end portion of the intermediate shaft 53. A lower end surface of the flange part 56 is an annular flat surface. The flange part 56 (specifically, the lower end surface of the flange part 56) may function as a portion for abutting on the tool accessory 91 from above and pushing down the tool accessory 91 in the process of downward movement of the intermediate shaft 53 relative to the spindle 3A.

The second cam part 55 is provided on the top of the flange part 56. The second cam part 55 is configured to cause the intermediate shaft 53 to move in the up-down direction relative to the spindle 3A in cooperation with the first cam part 33 of the spindle 3A, along with rotation of the intermediate shaft 53. The detailed structure of the second cam part 55 and action between the first and second cam parts 33 and 55 will be described below.

The upper part 57 has a smaller outer diameter than that of the lock part 541 and extends upward from the center of an upper end of the lock part 541. An upper end portion of the upper part 57 is configured as a male-thread part 571. Further, a fitting hole 573 is formed in an upper portion (below the male-thread part 571) of the upper part 57 and extends through the upper part 57 in a diameter direction. A pin 574 is fitted in the fitting hole 573 and both end portions of the pin 574 protrude to the outside from the fitting hole 573.

A rotation-transmitting member 576 is disposed on the upper side of the pin 574. The rotation-transmitting member 576 is configured to transmit turning (rotary movement) of the rotary lever 81 to the intermediate shaft 53 and is fixed to the intermediate shaft 53. In the present embodiment, the rotation-transmitting member 576 is a generally hexagonal columnar member having a through hole in its center and is fitted onto the intermediate shaft 53 (the upper part 57) on the upper side of the pin 574. Although not shown in detail, a linear groove is formed in a lower end of the rotation-transmitting member 576, and the opposite end portions of the pin 574 protruding from the fitting hole 573 are engaged with this groove. The rotation-transmitting member 576 is fastened to the pin 574 by a nut 572 which is threadedly engaged with the male-thread part 571, and thereby integrated with the intermediate shaft 53.

The rotation-transmitting member 576 has a pair of recesses 577 formed in its upper portion. The recesses 577 are symmetrically arranged across the driving axis A1. Each of the projections 815 of the rotary lever 81 always protrudes into a respective one of the recesses 577. When the rotary lever 81 is turned, the projection 815 may abut on a side surface of the recess 577 and cause the intermediate shaft 53 to rotate, via the rotation-transmitting member 576. In other words, the intermediate shaft 53 may rotate around the driving axis A1 relative to the spindle 3A, along with turning of the rotary lever 81. The length of the recess 577 in a circumferential direction is set to be larger than the diameter of the projection 815. With this structure, when the projection 815 is apart from the side surface of the recess 577, coordinated movement of the rotary lever 81 and the intermediate shaft 53 can be prevented. When the rotary lever 81 is placed in the initial position (see FIG. 1), the projection 815 is apart from the side surface of the recess 577.

The clamp spring 59 is configured to bias the clamp shaft 51 upward so as to apply to the clamp shaft 51 a clamping force for clamping the tool accessory 91. In the present embodiment, the clamp spring 59 is configured to bias the clamp shaft 51 upward via the intermediate shaft 53, and always biases the intermediate shaft 53 upward relative to the spindle 3A. More specifically, the clamp spring 59 is a compression coil spring and is disposed in a compressed state between annular spring-receiving parts 37 and 579. The spring-receiving part 37 is fitted onto the intermediate shaft 53 on the upper side of the spindle 3A. The spring-receiving part 579 is fitted onto the intermediate shaft 53 on the lower side of the pin 574. The lower spring-receiving part 37 is engaged with the spindle 3A to be non-rotatable relative to the spindle 3A. Therefore, the lower spring-receiving part 37 may rotate together with the spindle 3A.

The lock mechanism 6A is now described. The lock mechanism 6A is configured to lock the clamp shaft 51 such that the clamp shaft 51 cannot be removed from the spindle 3A. In the present embodiment, the lock mechanism 6A is configured to fix the clamp shaft 51 to the intermediate shaft 53 to thereby lock the clamp shaft 51.

As shown in FIGS. 4 and 5, the lock mechanism 6A includes three balls 61, a lock sleeve 63 and a ball-biasing spring 67.

As described above, the three balls 61 are respectively disposed within the three ball-holding holes 542 of the intermediate shaft 53 so as to be movable in the radial direction.

The lock sleeve 63 holds the balls 61 so as not to come off radially outward from the ball-holding holes 542. In the present embodiment, the lock sleeve 63 as a whole has a circular cylindrical shape, and is disposed radially outward of the lock part 541 of the intermediate shaft 53 above the spindle 3A. The lock sleeve 63 includes a sliding part 631, a ball-holding part 633 and a locking projection 638 which are integrally formed.

The sliding part 631 is a circular cylindrical portion having substantially the same inner diameter as the outer diameter of the lock part 541 of the intermediate shaft 53. The sliding part 631 is slidably fitted onto the lock part 541.

The ball-holding part 633 is a circular cylindrical portion which is connected to a lower end of the sliding part 631. As shown in FIGS. 4 and 6, the inner diameter of the ball-holding part 633 is slightly larger than that of the sliding part 631. A shoulder part (stepped part) 634 is formed in a portion connecting the sliding part 631 and the ball-holding part 633. The shoulder part 634 has an inner peripheral surface which is curved while being slightly inclined radially outward and downward. The inner peripheral surface of the shoulder part 634 is configured to generally conform to an outer peripheral surface of the ball 61. The inner diameter of the ball-holding part 633 is set to such a length that the ball 61 is held between the inner peripheral surface of the ball-holding part 633 and a bottom of the engagement groove 512 of the clamp shaft 51 when the ball 61 is located in the innermost position in the radial direction within its movable range and engaged with the engagement groove 512 of the clamp shaft 51.

Figure 7:
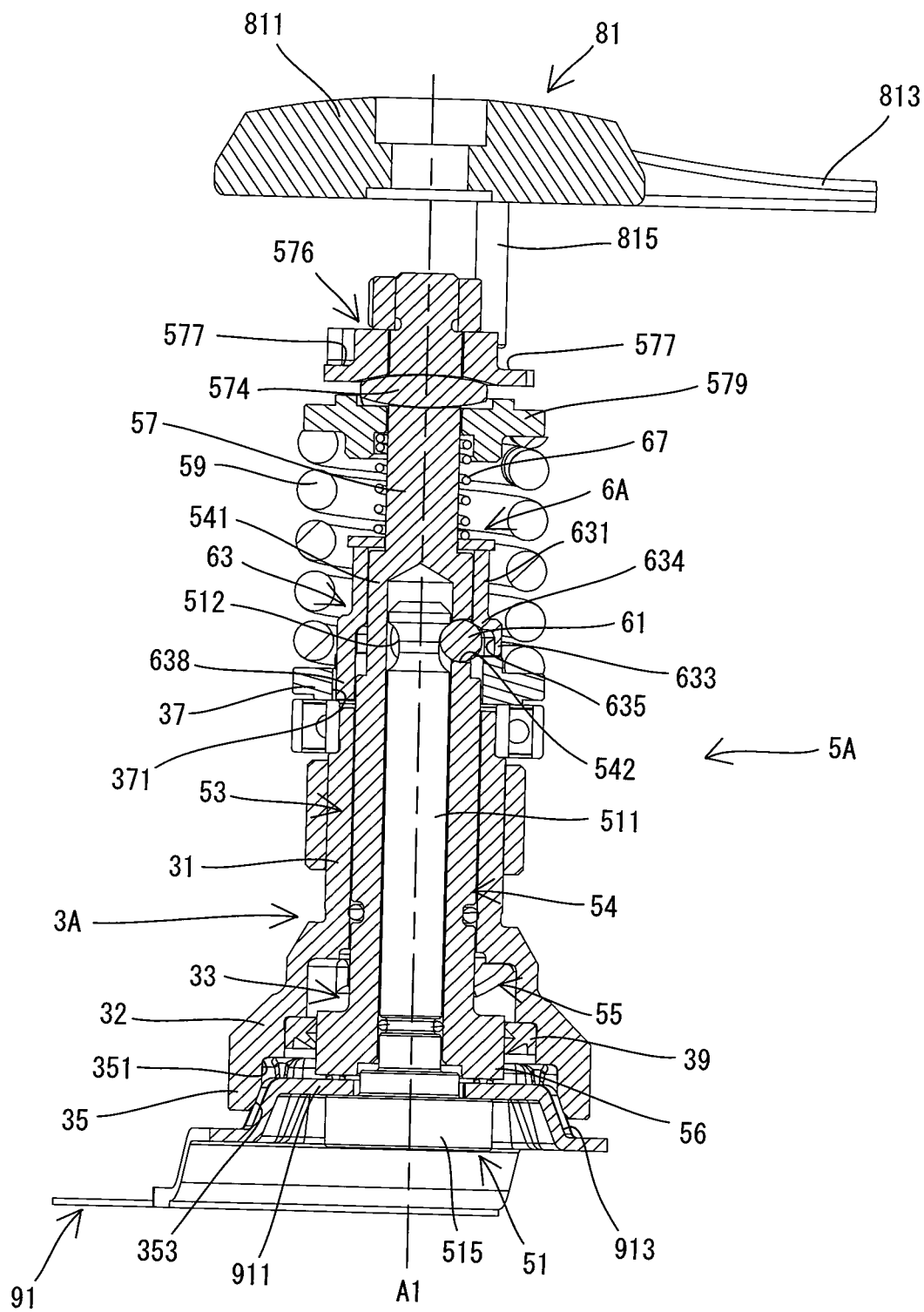
FIG. 7 is a sectional view (a section passing through the center of the ball and the driving axis which are shown in FIG. 3) of the spindle, the clamp mechanism and the rotary lever when the rotary lever is turned approximately 90 degrees from the initial position in a release direction.

As shown in FIGS. 6 and 7, three ball-receiving parts 635 are formed on an inner side of the ball-holding part 633 at equal intervals in a circumferential direction of the ball-holding part 633. The ball-receiving part 635 is a recess which is recessed radially outward from the inner peripheral surface of the ball-holding part 633 and forms a space for retracting the ball 61 when the clamp shaft 51 is unlocked. As shown by a dotted line in FIG. 6, the depth of the ball-receiving part 635 in the radial direction is set such that the ball 61 can retract up to a position where the ball 61 does not protrude radially inward from the ball-holding hole 542. Further, the length of the ball-receiving part 635 in the circumferential direction is set to be longer than the diameter of the ball 61 and to correspond to a specified angle range (approximately 30 degrees in the present embodiment) around the driving axis A1.

As shown in FIGS. 5 and 7, the locking projection 638 is a rectangular projection protruding downward from a lower end of the ball-holding part 633 and fitted in a recess 371 formed in the lower spring-receiving part 37. The recess 371 is recessed downward from an upper end of the spring-receiving part 37 and has a rectangular shape generally conforming to the locking projection 638. The lock sleeve 63 cannot rotate relative to the spring-receiving part 37 and thus to the spindle 3A, due to the engagement of the locking projection 638 and the recess 371. However, the locking projection 638 is allowed to slide in the up-down direction within the recess 371, so that the lock sleeve 63 is allowed to move in the up-down direction relative to the spindle 3A.

The ball-biasing spring 67 always biases the lock sleeve 63 downward and thereby holds the lock sleeve 63 in a position where the inner peripheral surface of the shoulder part 634 abuts on the balls 61. In the present embodiment, the ball-biasing spring 67 is a compression coil spring having a smaller diameter than the clamp spring 59. Further, the ball-biasing spring 67 has a significantly smaller spring constant than the clamp spring 59. The ball-biasing spring 67 is disposed in a compressed state between the upper spring-receiving part 579 and a washer 69 which is fitted onto the upper part 57 of the intermediate shaft 53 on the upper side of the lock sleeve 63.

The lock mechanism 6A having the above-described structure may be switched between a lock state and an unlock state when the relative position between the balls 61 and the lock sleeve 63 in the circumferential direction around the driving axis A1 changes along with rotation of the intermediate shaft 53.

The lock state refers to a state in which the lock mechanism 6A is capable of locking the clamp shaft 51. The lock state can also be rephrased as a state in which the lock sleeve 63 holds the balls 61 on the innermost sides in the radial direction within their movable ranges as shown in FIGS. 4 and 6. When placed in the lock state with the clamp shaft 51 inserted into the intermediate shaft 53 and the balls 61 engaged with the engagement groove 512 of the clamp shaft 51, the lock mechanism 6A fixedly holds the clamp shaft 51 relative to the intermediate shaft 53 so as not to be removed from the spindle 3A. The position of the ball 61 located on the innermost side in the radial direction within the movable range is also referred to as an engagement position in the following description.

Figure 8:
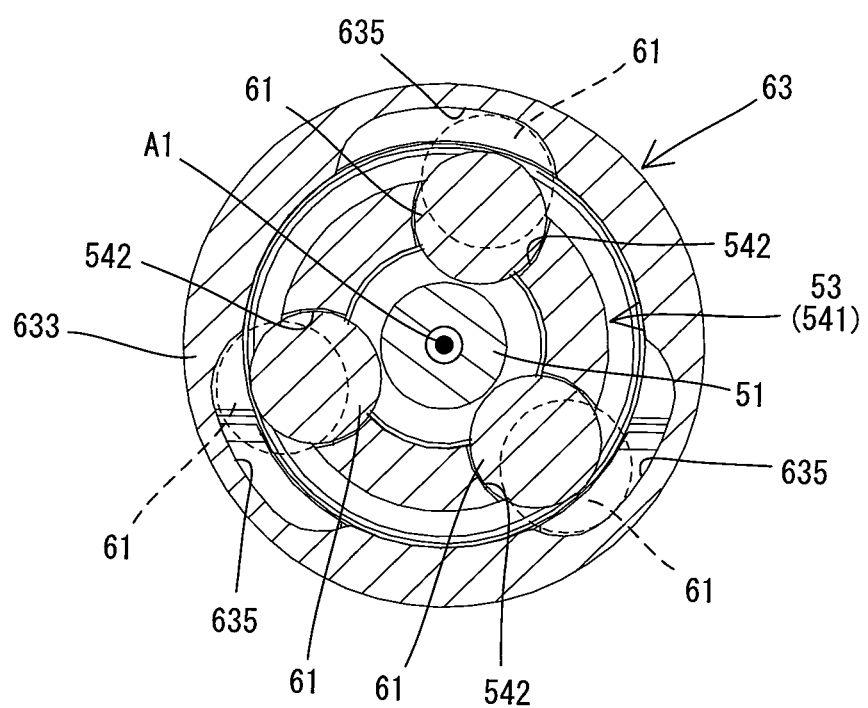
FIG. 8 is a sectional view corresponding to FIG. 6 and showing the state when the rotary lever is turned approximately 90 degrees from the initial position in the release direction.

The unlock state refers to a state in which the lock mechanism 6A allows attachment and detachment of the clamp shaft 51 relative to the spindle 3A (i.e. a state in which the lock is released). The unlock state can also be rephrased as a state in which the lock sleeve 63 holds the balls 61 so as to allow the balls 61 to retract radially outward of the innermost ends of the respective ball-holding holes 542 as shown in FIGS. 7 and 8. The position of the ball 61 (shown by the dotted line in FIG. 6) located radially outward of the innermost end of the ball-holding hole 542 is also referred to as a retraction position in the following description.

The lock mechanism 6A of the present embodiment is configured to provisionally hold the clamp shaft 51 in the unlock state. To "provisionally hold" herein means to maintain the position of the clamp shaft 51 relative to the spindle 3A unless an external force (typically, a force of the user in a direction to pull out the clamp shaft) is applied to the clamp shaft 51. As described above, the lock sleeve 63 is always biased downward by the ball-biasing spring 67 and the inner peripheral surface of the shoulder part 634 abuts on a portion of the outer peripheral surface of each ball 61 which protrudes radially outward from the ball-holding hole 542. Thus, the ball 61 is biased radially inward and held in the engagement position even in the unlock state. Therefore, the clamp shaft 51 is held by the intermediate shaft 53 via the balls 61 and does not slip off the spindle 3A unless an external force for moving the balls 61 radially outward from their engagement positions is applied to the clamp shaft 51 against the biasing force of the ball-biasing spring 67. The state that the clamp shaft 51 is provisionally held is also referred to as a provisional lock state in the following description.

When the clamp shaft 51 in the provisional lock state is pulled downward, the balls 61 are pushed by the upper end portion of the shaft part 511 (on the upper side of the engagement groove 512) and then moved to their retraction positions while pushing up the shoulder part 634 against the biasing force of the ball-biasing spring 67. On the other hand, when the clamp shaft 51 is inserted into the intermediate shaft 53 in the unlock state of the lock mechanism 6A, the balls 61 are once moved to their retraction positions by the upper end portion of the shaft part 511 and the upper end portion climbs over the balls 6. Then, the balls 61 are returned to their engagement positions by the biasing force of the ball-biasing spring 67. Thus, the clamp shaft 51 is provisionally held by the intermediate shaft 53 via the balls 61.

The structures of the second cam part 55 of the intermediate shaft 53 and the first cam part 33 of the spindle 3A are now described in detail.

Figure 9:
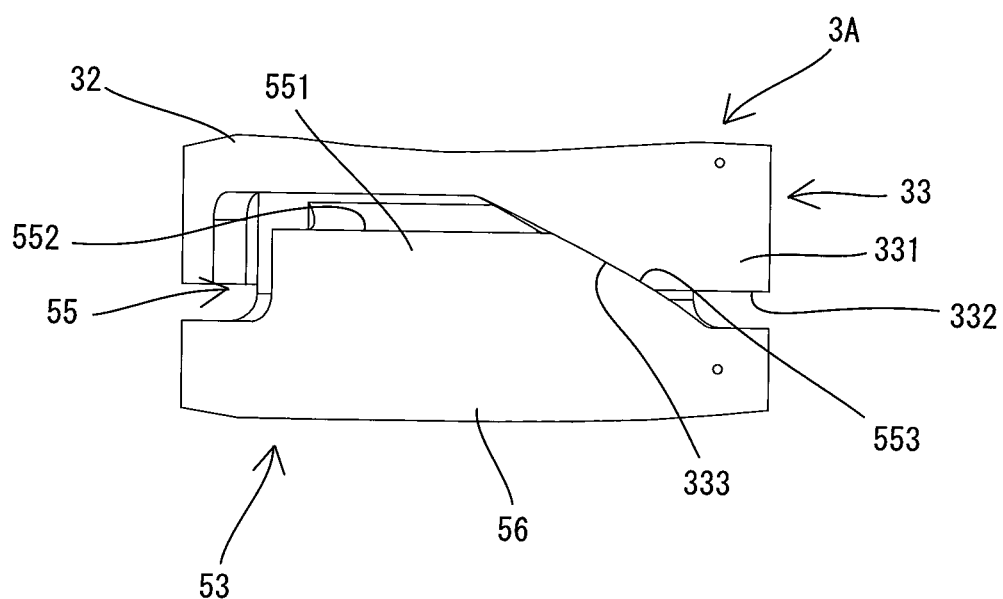
FIG. 9 is an explanatory drawing for illustrating a first cam part and a second cam part when the rotary lever is placed in the initial position.

As shown in FIGS. 5 and 9, the second cam part 55 of the present embodiment is formed by a pair of protrusions 551. Each of the protrusions 551 is formed in a circular arch shape along an outer periphery of the flange part 56 and protrudes upward. Further, the protrusions 551 are symmetrically arranged relative to the driving axis A1. Each of the protrusions 551 has an upper surface including an orthogonal face 552 and a cam face 553. The orthogonal face 552 is a flat surface which is orthogonal to the driving axis A1 and forms a protruding end surface (upper end surface) of the protrusion 551. The cam face 553 is an inclined face inclined in the circumferential direction and is contiguous to an end of the orthogonal face 552 on the release direction side. More specifically, the cam face 553 is inclined downward from the orthogonal face 552 in the release direction (shown by an arrow R in FIG. 5).

As shown in FIG. 9, the first cam part 33 of the present embodiment is formed by a pair of protrusions 331. Each of the protrusions 331 is formed in a circular arch shape along an inner periphery of the upper end portion of the flange part 32 and protrudes downward. The protrusions 331 are also symmetrically arranged relative to the driving axis A1. In FIG. 9, for convenience of explanation, the flange part 32 is shown with its part on the outer periphery side of the protrusion 331 omitted. The same applies to other similar drawings referenced below. Further, Each of the protrusions 331 has a shape generally conforming to the protrusion 551. Each of the protrusions 331 has a lower surface including an orthogonal face 332 and a cam face 333. The orthogonal face 332 is a flat surface which is orthogonal to the driving axis A1 and forms a protruding end surface (lower end surface) of the protrusion 331. The cam face 333 is an inclined face inclined in the circumferential direction and is contiguous to an end of the orthogonal face 332 on the clamp direction side. The cam face 333 conforms to the cam face 553 of the second cam part 55. The cam face 333 is inclined upward from the orthogonal face 332 in the clamp direction.

As described above, the intermediate shaft 53 is always biased upward relative to the spindle 3A by the clamp spring 59 (see FIG. 4). Therefore, the lower surface of the protrusion 331 of the first cam part 33 and the upper surface of the protrusion 551 of the second cam part 55 are normally kept at least partially in abutment with each other. When the first and second cam parts 33 and 55 rotate relative to each other with the cam faces 333 and 553 in abutment with each other, the first and second cam parts 33 and 55 can cause the intermediate shaft 53 to move in the up-down direction relative to the spindle 3A. Accordingly, the first and second cam parts 33 and 55 can also be referred to as a motion-converting mechanism configured to convert rotation of the intermediate shaft 53 around the driving axis A1 relative to the spindle 3A into linear movement of the intermediate shaft 53 in the up-down direction relative to the spindle 3A. Further, when rotating relative to each other with the orthogonal faces 332 and 552 in abutment with each other, the first and second cam parts 33 and 55 allow the intermediate shaft 53 only to rotate relative to the spindle 3A and does not allow the intermediate shaft 53 to move in the up-down direction relative to the spindle 3A.

In the present embodiment, by utilizing the first and second cam parts 33 and 55 as such a motion-converting mechanism, when the rotary lever 81 is turned within a specified angle range from the initial position, the intermediate shaft 53 can be moved downward while being rotated relative to the spindle 3A so that the clamping force is released and the tool accessory 91 is pushed out downward. When the rotary lever 81 is further turned beyond the specified angle range, the intermediate shaft 53 can be rotated relative to the spindle 3A and the clamp shaft 51 locked by the lock mechanism 6A is unlocked and allowed to be removed from the spindle 3A. This point is described below in detail.

The operation of removing the clamp shaft 51 from the spindle 3A (the intermediate shaft 53) is now described.

As shown in FIGS. 4, 6 and 9, when the rotary lever 81 is placed in the initial position and the clamp shaft 51 is locked by the lock mechanism 6A, the intermediate shaft 53 is pushed up together with the clamp shaft 51 to a position in which the cam face 333 and the cam face 553 partially abut on each other, by the biasing force of the clamp spring 59. The tool accessory 91 is pressed against the tool-mounting part 35, with the inclined face 913 in abutment with the inclined face 353, by the head part 515 abutting on the lower surface of the tool accessory 91 and is thereby fixed to the spindle 3A. Thus, the head part 515 clamps the tool accessory 91 in cooperation with the tool-mounting part 35 with the clamping force (force of pressing the tool accessory 91 upward against the spindle 3A) applied thereto by the clamp spring 59. The positions of the intermediate shaft 53 and the clamp shaft 51 relative to the spindle 3A at this time are referred to as a clamp position. When the intermediate shaft 53 is located in the clamp position, a lower end surface of the second cam part 55 (a lower end surface of the intermediate shaft 53) is slightly apart upward from an upper surface of the tool accessory 91.

As described above, when the rotary lever 81 is placed in the initial position, the projections 815 of the rotary lever 81 are apart from the side surfaces of the respective recesses 577 of the rotation-transmitting member 576. Therefore, when the user turns the rotary lever 81 from the initial position in the release direction, only the rotary lever 81 is turned until the projections 815 abut on the side surfaces of the recesses 577. In the present embodiment, when the rotary lever 81 is turned approximately 45 degrees from the initial position in the release direction, the projections 815 abut on the side surfaces of the respective recesses 577.

When the user further turns the rotary lever 81, the intermediate shaft 53 rotates around the driving axis A1 relative to the spindle 3A. At this time, the intermediate shaft 53 moves downward against the biasing force of the clamp spring 59 while rotating in the release direction by action between the cam faces 333 and 553. Thus, the clamping force (for pressing the tool accessory 91 upward against the spindle 3A) applied to the head part 515 by the clamp spring 59 is released. Further, in the process of downward movement of the intermediate shaft 53, the lower end surface of the flange part 56 abuts on the tool accessory 91 from above. The intermediate shaft 53 further moves downward in this state and thereby pushes the tool accessory 91 downward. Specifically, the intermediate shaft 53 (the flange part 56) comes in surface contact with the upper surface of the tool accessory 91 in an annular region encircling the driving axis A1 and pushes down the tool accessory 91. When the tool accessory 91 is oscillatorily driven while being pressed against the tool-mounting part 35 from below by the head part 515 with the inclined face 913 in abutment with the inclined face 353, the tool accessory 91 may be stuck to the tool-mounting part 35. Even in such a case, the intermediate shaft 53 can eliminate the stuck state of the tool accessory 91 when moving downward.

Figure 10:
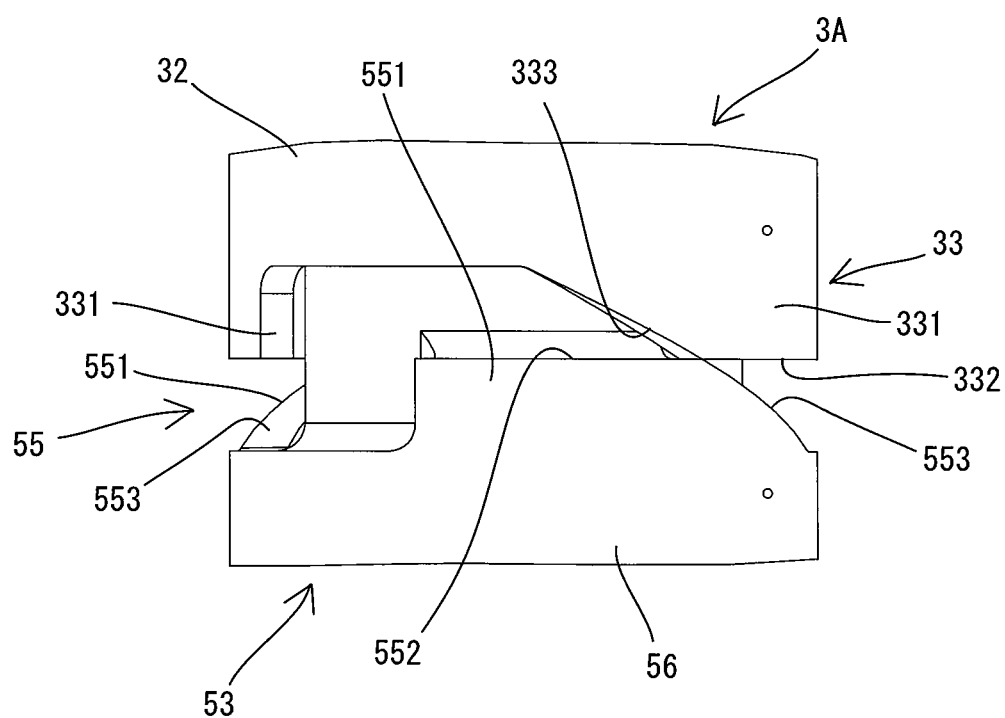
FIG. 10 is an explanatory drawing for illustrating the first cam part and the second cam part when the rotary lever is turned approximately 65 degrees from the initial position in the release direction.
Figure 11:
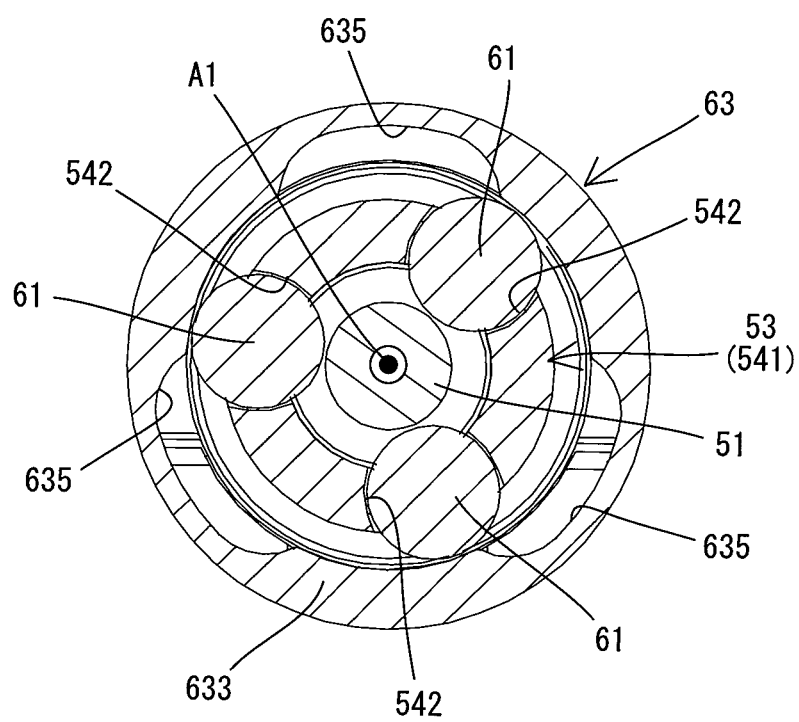
FIG. 11 is a sectional view corresponding to FIG. 6 and showing the state when the rotary lever is turned approximately 65 degrees from the initial position in the release direction.

In the present embodiment, the lock mechanism 6A is configured to maintain the lock state while the intermediate shaft 53 moves downward while rotating relative to the spindle 3A with the cam faces 333 and 553 in abutment with each other. Specifically, the lock mechanism 6A maintains the lock state while the rotary lever 81 is turned in the release direction within the specified angle range from the initial position. In the present embodiment, this specified angle range is set to approximately 65 degrees. While the rotary lever 81 is turned approximately 65 degrees from the initial position, as shown in FIG. 10, the intermediate shaft 53 moves downward while rotating relative to the spindle 3A to a position where an upper end of the cam face 553 comes into contact with a lower end of the cam face 333. As described above, since the lock sleeve 63 is held so as not to rotate relative to the spindle 3A, the intermediate shaft 53 rotates together with the balls 61 relative to the lock sleeve 63 as well. Even when the rotary lever 81 is turned approximately 65 degrees from the initial position, as shown in FIG. 11, the balls 61 held by the intermediate shaft 53 do not reach the respective positions of the ball-receiving parts 635. Therefore, in spite of the rotation of the intermediate shaft 53, the balls 61 are held between the clamp shaft 51 and the lock sleeve 63 in their engagement positions and thus the lock mechanism 6A maintains the lock state.

Figure 12:
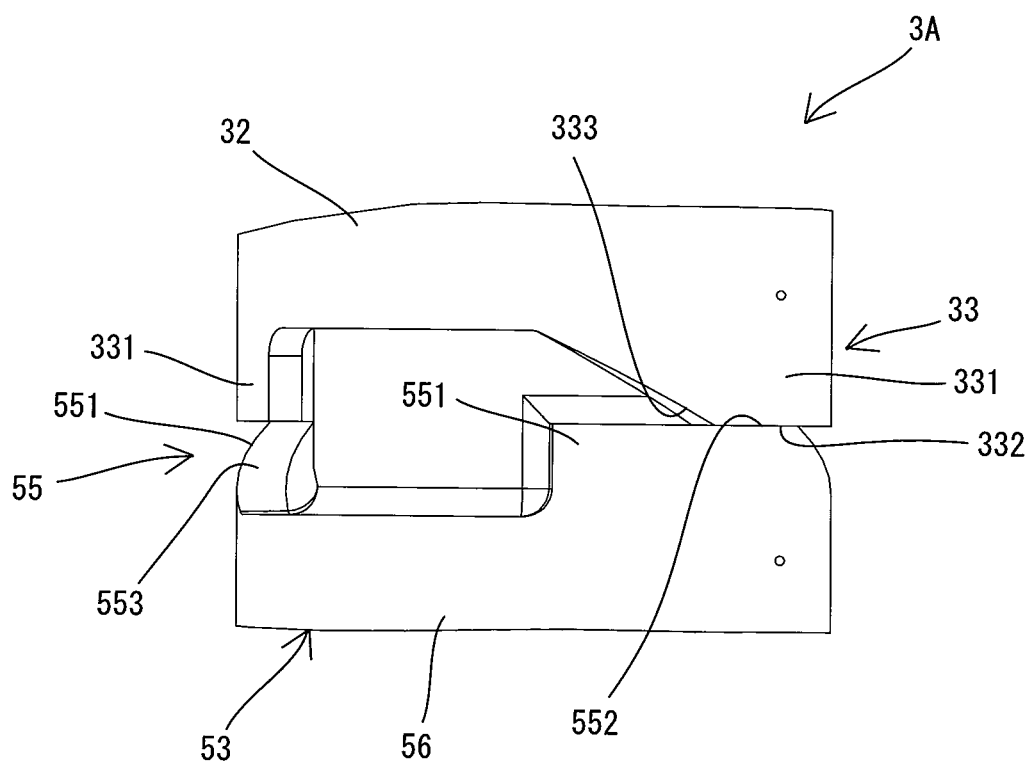
FIG. 12 is an explanatory drawing for illustrating the first cam part and the second cam part when the rotary lever is turned approximately 90 degrees from the initial position in the release direction.

When the rotary lever 81 is turned beyond a position of approximately 65 degrees from the initial position in the release direction, the intermediate shaft 53 rotates relative to the spindle 3A but does not move in the up-down direction. More specifically, as shown in FIG. 12, the intermediate shaft 53 is held in a position in the up-down direction where the orthogonal face 552 of the second cam part 55 abuts on the orthogonal face 332 of the first cam part 33 of the spindle 3A, by the biasing force of the clamp spring 59.

Further, in the present embodiment, the lock mechanism 6A is configured to be switched to the unlock state in a process that the intermediate shaft 53 rotates relative to the spindle 3A with the orthogonal faces 332 and 552 in abutment with each other. In other words, the lock mechanism 6A is configured to unlock the clamp shaft 51 when the rotary lever 81 is turned from the initial position beyond the specified angle range in the release direction. In the present embodiment, when the rotary lever 81 is turned beyond the position of approximately 65 degrees from the initial position and reaches a position of approximately 90 degrees, the lock mechanism 6A is switched to the unlock state. When the rotary lever 81 is turned approximately 90 degrees from the initial position, as shown in FIG. 8, the balls 61 held by the intermediate shaft 53 face the respective ball-receiving parts 635 and are allowed to move to their retraction positions shown by the dotted line. Thus, the lock mechanism 6A is switched to the unlock state and the clamp shaft 51 is placed in the provisional lock state.

Figure 13:
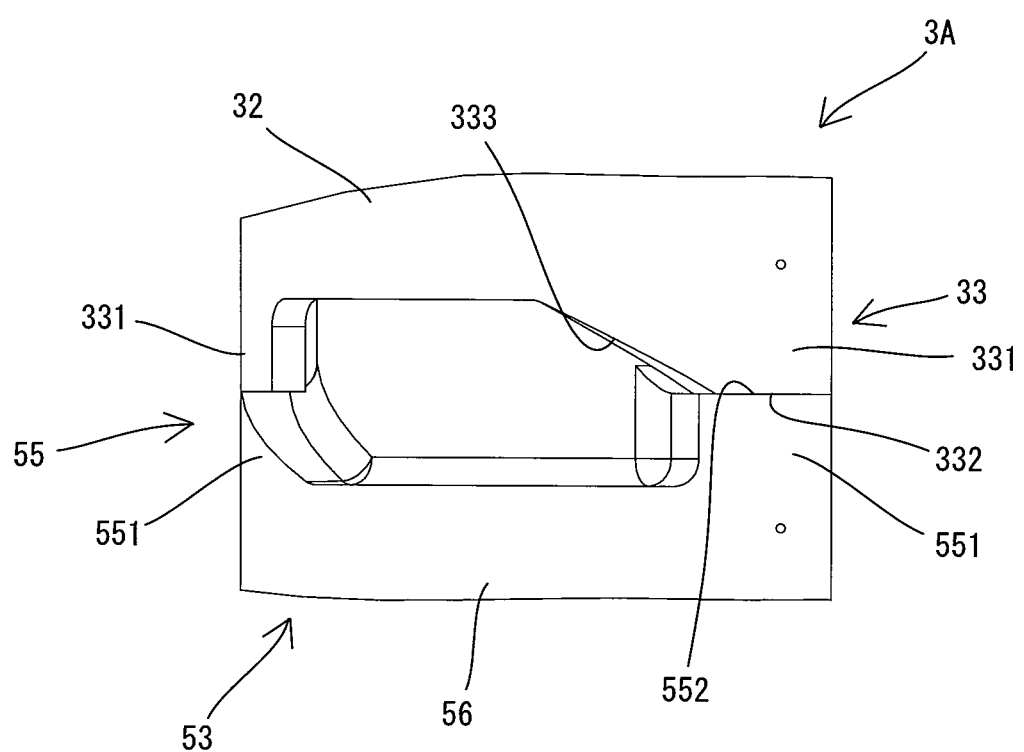
FIG. 13 is an explanatory drawing for illustrating the first cam part and the second cam part when the rotary lever is turned approximately 120 degrees from the initial position in the release direction.
Figure 14:
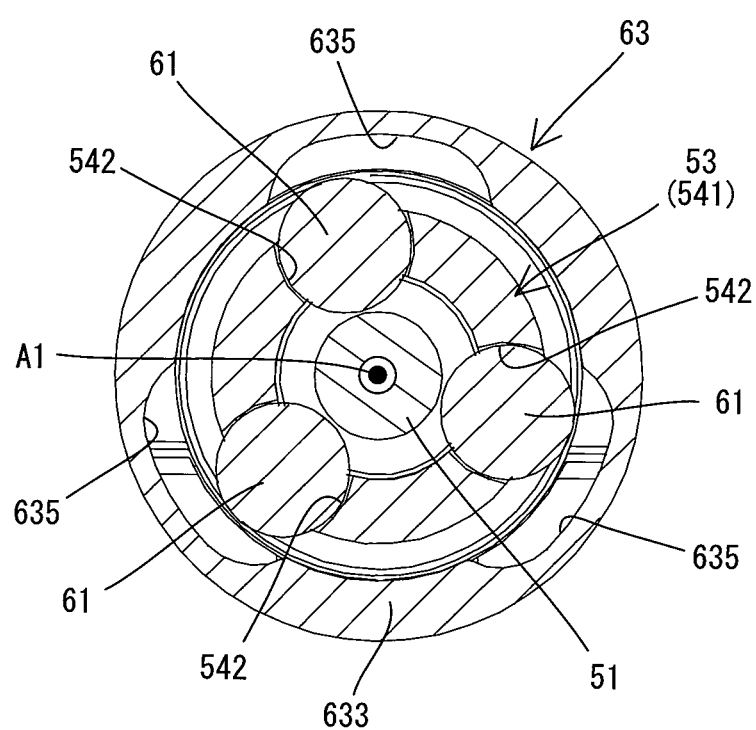
FIG. 14 is a sectional view corresponding to FIG. 6 and showing the state when the rotary lever is turned approximately 120 degrees from the initial position in the release direction.

While the rotary lever 81 is further turned from the position of approximately 90 degrees to a position of approximately 120 degrees from the initial position in the release direction, as shown in FIG. 13, the orthogonal face 552 of the second cam part 55 is also held in abutment with the orthogonal face 332 of the first cam part 33 of the spindle 3A by the biasing force of the clamp spring 59, and the intermediate shaft 53 does not move in the up-down direction. Further, as described above, in the unlock state, the balls 61 held by the intermediate shaft 53 are held in their engagement positions in abutment with the shoulder part 634 by the biasing force of the ball-biasing spring 67. Further, the length of the ball-receiving part 635 in the circumferential direction is set to correspond to an angle range of approximately 30 degrees around the driving axis A1. Therefore, when the rotary lever 81 is turned within the angle range of approximately 90 to 120 degrees from the initial position in the release direction, as shown in FIG. 14, each of the balls 61 rotates, together with the intermediate shaft 53, in engagement with the clamp shaft 51 in the engagement position and moves in the circumferential direction within the ball-receiving part 635. Further, the provisional lock state of the clamp shaft 51 can be more stably maintained by frictional force of the elastic member 513 fitted onto the lower end portion of the shaft part 511.

As described above, in the present embodiment, the lock mechanism 6A is held in the unlock state when the rotary lever 81 is located anywhere within the angle range of approximately 90 to 120 degrees from the initial position. Therefore, the user can remove the tool accessory 91 and the clamp shaft 51 from the spindle 3A and the intermediate shaft 53 by turning the rotary lever 81 to any position within this angle range and then pulling down the clamp shaft 51 in the provisional lock state. Further, since the intermediate shaft 53 is held in the position in the up-down direction where the orthogonal face 552 abuts on the orthogonal face 332, the intermediate shaft 53 does not move in the up-down direction even if the user stops operating the rotary lever 81. Therefore, the user can easily remove the clamp shaft 51 and the tool accessory 91.

The operation of mounting the clamp shaft 51 to the spindle 3A (the intermediate shaft 53) and clamping the tool accessory 91 is basically the reverse of the removal operation.

Specifically, the user unlocks the lock mechanism 6A by turning the rotary lever 81 to any position within the angle range of approximately 90 to 120 degrees from the initial position. Then, the user inserts the clamp shaft 51 through the tool accessory 91 and then into the intermediate shaft 53. The upper end portion of the shaft part 511 abuts on the balls 61 from below and once moves the balls 61 to the retraction positions. When the upper end portion of the shaft part 511 climbs over the balls 61, the balls 61 return to the engagement positions by the biasing force of the ball-biasing spring 67. Thus, the clamp shaft 51 is brought into the provisional lock state.

When the user turns the rotary lever 81 toward the initial position from this position in the clamp direction, the lock mechanism 6A is switched to the lock state. When the rotary lever 81 is further turned in the clamp direction, the state of abutment between the first and second cam parts 33 and 55 is switched from the state in which the orthogonal faces 332 and 552 abut on each other, to the state in which the cam faces 333 and 553 abut on each other. When the rotary lever 81 is turned in the clamp direction, each of the projections 815 abuts on the other side surface of the recess 577 opposite in the circumferential direction from the side surface on which it abuts when the rotary lever 81 is turned in the release direction. Therefore, the state of the lock mechanism 6A and the state of abutment between the first and second cam parts 33 and 55 change when the rotary lever 81 is turned in the clamp direction to a position closer to the initial position than when the rotary lever 81 is turned in the release direction.

When the user further turns the rotary lever 81 in the clamp direction, the intermediate shaft 53 moves upward while rotating. After the rotary lever 81 is returned to the initial position, the intermediate shaft 53 and the clamp shaft 51 move upward while rotating with the projections 815 located apart from the respective side surfaces of the recesses 577 and return to the clamp position by the biasing force of the clamp spring 59 and by action between the cam faces 333 and 553.

As described above, in the oscillating tool 1A of the present embodiment, when the rotary lever 81 is turned in the release direction by the user, the intermediate shaft 53 is moved downward relative to the spindle 3A by the first and second cam parts 33 and 55, and in this process, the flange part 56 pushes the tool accessory 91 downward. Therefore, even if the tool accessory 91 is stuck to the lower end portion (the tool-mounting part 35) of the spindle 3A, the user can easily remove the tool accessory 91 simply by turning the rotary lever 81 in the release direction. Further, since the clamp shaft 51 is removable from the spindle 3A, the user can remove the clamp shaft 51 from the spindle 3A when replacing the tool accessory 91.

The spring-receiving part 579 for receiving an upper end of the clamp spring 59 is configured to move downward together with the intermediate shaft 53 against the upward biasing force of the clamp spring 59, along with turning of the rotary lever 81 in the release direction and thereby release the clamping force. The intermediate shaft 53 (the flange part 56) can push the tool accessory 91 downward with the clamping force released. Therefore, an excessive pushing-down force need not be applied to the tool accessory 91.

The lock mechanism 6A is configured to unlock the clamp shaft 51 along with turning of the rotary lever 81 in the release direction. Therefore, the user can cause the oscillating tool 1A to perform both the operation of releasing the clamping force and the operation of unlocking the clamp shaft 51 simply by a single operation of turning the rotary lever 81 in the release direction. Particularly, in the present embodiment, along with turning of the rotary lever 81 within the specified angle range from the initial position in the release direction, the intermediate shaft 53 is moved downward relative to the spindle 3A by the first and second cam parts 33 and 55, thereby releasing the clamping force and pushing down the tool accessory 91. Further, the intermediate shaft 53 rotates relative to the spindle 3A along with turning of the rotary lever 81 beyond the specified angle range in the release direction, and the lock mechanism 6A unlocks the clamp shaft 51. Therefore, the user can cause the oscillating tool 1A to perform an efficient series of the operations of releasing the clamping force and pushing down the tool accessory 91 and subsequently unlocking the clamp shaft 51 simply by a single operation of turning the rotary lever 81 beyond the specified angle range in the release direction.

Further, in the present embodiment, the lock mechanism 6A is configured to provisionally hold the clamp shaft 51 in the unlock state in which the clamp shaft 51 is unlocked. Therefore, the clamp shaft 51 can be prevented from slipping off the spindle 3A when the clamp shaft 51 is unlocked. When mounting the clamp shaft 51, the user can provisionally lock the clamp shaft 51 and then turn the rotary lever 81 in the clamp direction so that the clamp shaft 51 is locked by the lock mechanism 6A. Therefore, the user need not hold the clamp shaft 51 so as to prevent the clamp shaft 51 from slipping off the spindle 3A until the clamp shaft 51 is locked, so that maneuverability can be improved.

Second Embodiment

An oscillating tool 1B according to a second embodiment is now described with reference to FIGS. 15 to 20. The oscillating tool 1B of the present embodiment is different from the oscillating tool 1A of the first embodiment (see FIGS. 1 to 3) mainly in some structures of a spindle 3B and a clamp mechanism 5B, but most of the structures are substantially the same (including some structures each having a slightly different shape) as the oscillating tool 1A. Therefore, in the following description, structures which are substantially identical to those of the oscillating tool 1A are given the same numerals as in the oscillating tool 1A and are not or briefly shown and described, and different structures are mainly described.

Figure 15:
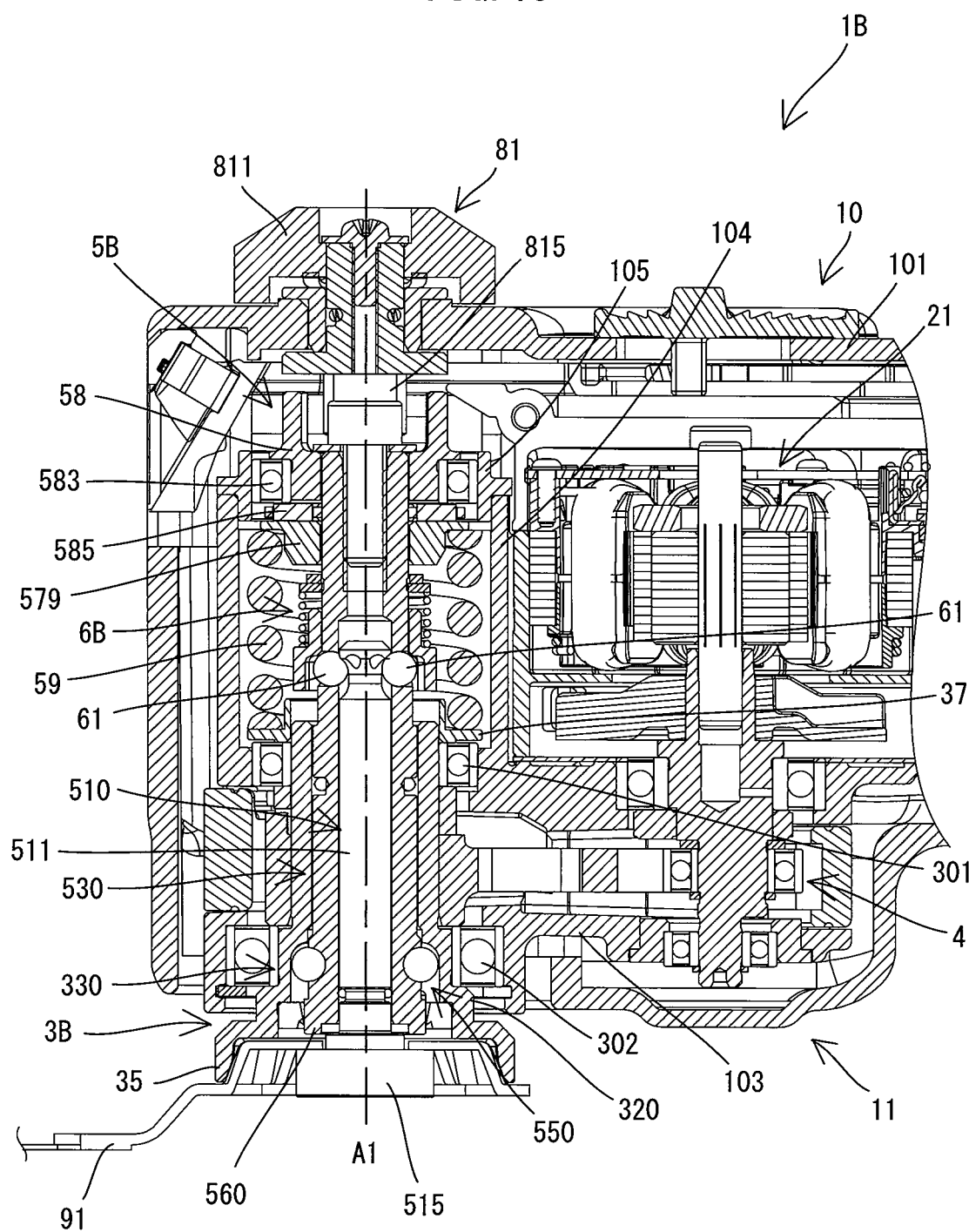
FIG. 15 is a sectional view of a front end portion of another oscillating tool when a rotary lever is placed in an initial position.

As shown in FIG. 15, the spindle 3B of the present embodiment has substantially the same structure as the spindle 3A of the first embodiment (see FIGS. 3 and 4), except for a flange part 320 (specifically, a first cam part 330). The detailed structure of the first cam part 330 will be described below in conjunction with a second cam part 550.

The structure of a clamp mechanism 5B of the present embodiment is now described. In the present embodiment, the clamp mechanism 5B includes a clamp shaft 510, an intermediate shaft 530, the clamp spring 59 and a lock mechanism 6B. These structures are now described in this order.

Figure 16:
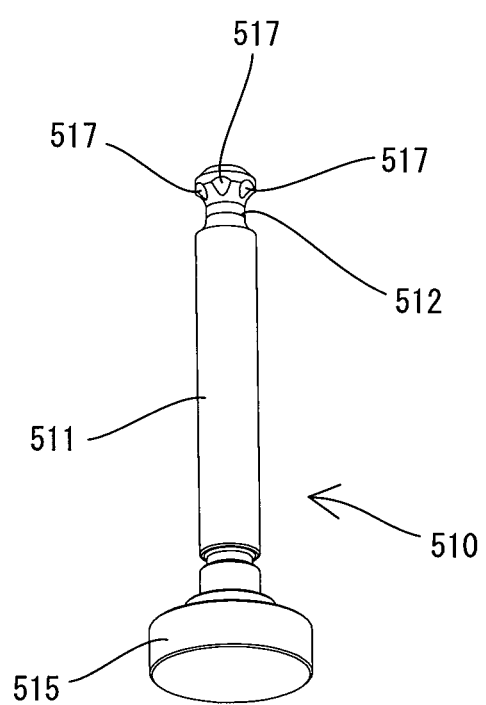
FIG. 16 is a perspective view showing a clamp shaft.

First, the clamp shaft 510 is described. As shown in FIG. 16, in an upper end portion of the clamp shaft 510 of the present embodiment, a plurality of recesses 517 are provided, in addition to the engagement groove 512. The recesses 517 are formed apart from each other in the circumferential direction in an upper end portion of the engagement groove 512. Each of the recesses 517 is configured to engage with a portion of the ball 61 so as to restrict movement of the ball 61 in the circumferential direction when the ball 61 is located within the engagement groove 512.

Figure 17:
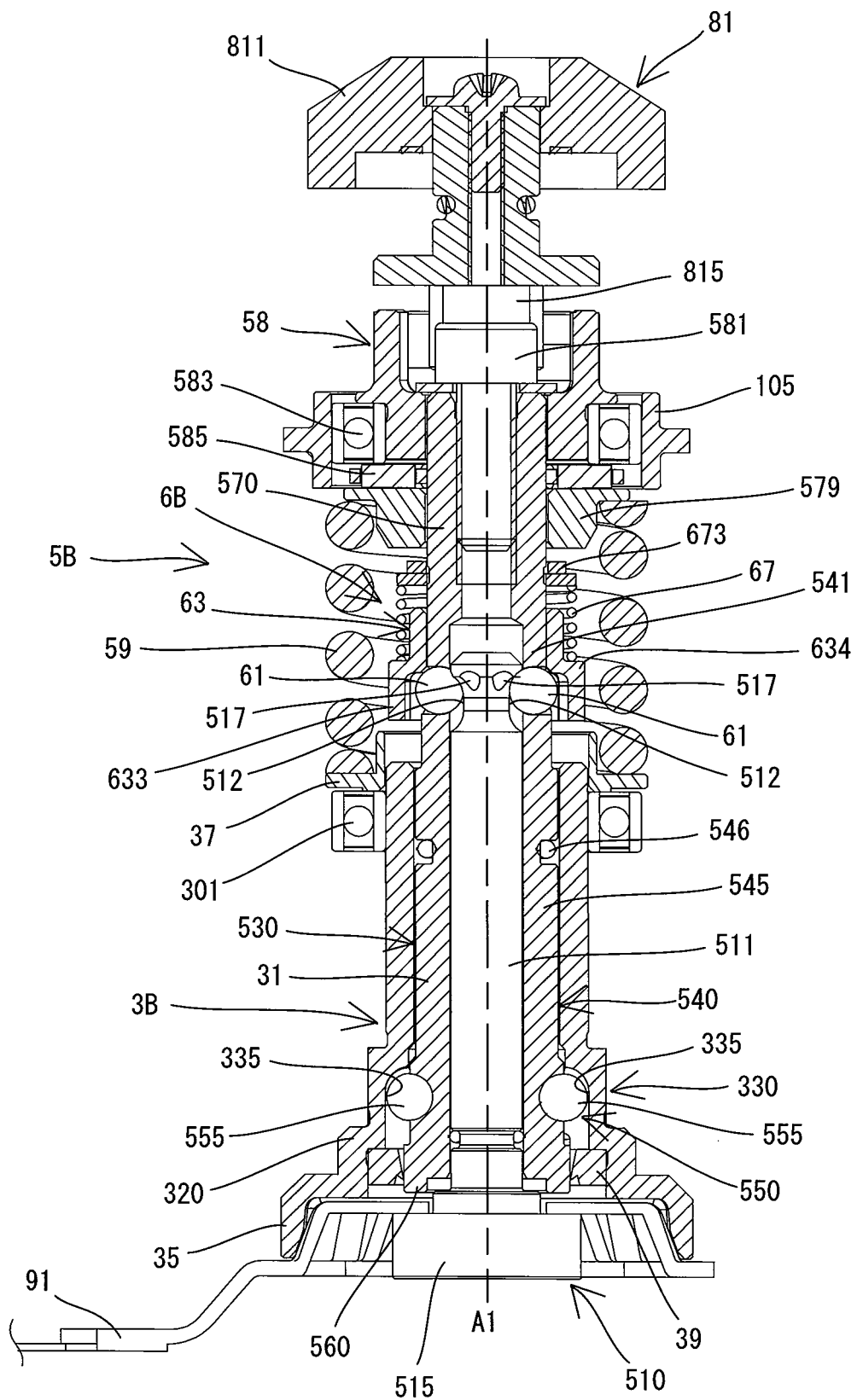
FIG. 17 is an enlarged view of a spindle, a clamp mechanism and the rotary lever of FIG. 15.
Figure 18:
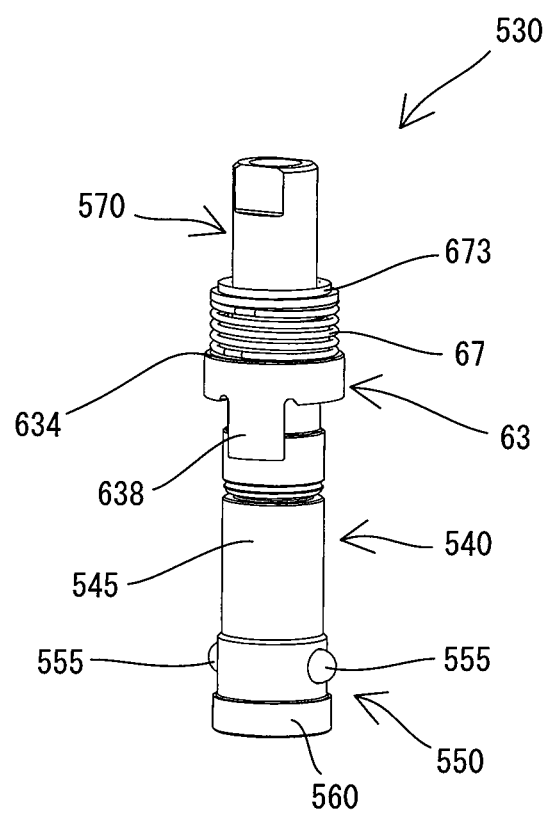
FIG. 18 is a perspective view showing an intermediate shaft and a lock mechanism.

Next, the intermediate shaft 530 is described. As shown in FIGS. 15, 17 and 18, like the intermediate shaft 53 of the first embodiment, the intermediate shaft 530 is coaxially arranged with the spindle 3B to extend in the up-down direction, and configured to hold the clamp shaft 510. In the present embodiment, the intermediate shaft 530 is an elongate circular cylindrical member including a lower part 540 and an upper part 570.

The lower part 540 is a portion into which a shaft part 511 of the clamp shaft 510 may be inserted, and includes the lock part 541, the sliding part 545, a second cam part 550 and a flange part 560.

In the present embodiment, the second cam part 550 is not a portion of the flange part 560 and is provided on the upper side of the flange part 560 (i.e. between the sliding part 545 and the flange part 560 in the up-down direction). The structure of the second cam part 550 will be described below in detail.

In the present embodiment, the flange part 560 does not have the cam faces 553 (see FIG. 5) provided on the flange part 56 of the first embodiment. Therefore, the outer diameter of the flange part 560 is set to be smaller than that of the flange part 56 of the first embodiment. Further, the height of the flange part 560 in the up-down direction is also smaller than that of the flange part 56. However, the flange part 560 has the same function as the flange part 56. Specifically, the flange part 560 (specifically, an annular lower end surface of the flange part 560) functions as a portion for abutting on the tool accessory 91 from above and pushing down the tool accessory 91 in the process of downward movement of the intermediate shaft 530 relative to the spindle 3B.

The upper part 570 is a circular cylindrical portion extending upward from an upper end of the lock part 541. An upper end portion of the upper part 570 is configured as a female-thread part. A bolt 581 for fixing a rotation-transmitting member 58 is fastened to the female-thread part.

In the present embodiment, the rotation-transmitting member 58 is fixed to the intermediate shaft 530 by the bolt 581 fastened to the female-thread part of the upper part 570. Further, a pair of recesses are formed in an outer periphery of the upper end portion of the intermediate shaft 530 (see FIG. 18). Although not shown in detail, a pair of protrusions are formed on an inner periphery of the rotation-transmitting member 58 and fitted in these recesses, and the rotation-transmitting member 58 is integrated with the intermediate shaft 530 by the bolt 581 being fastened.

Like the rotation-transmitting member 576 (see FIG. 4) of the first embodiment, the rotation-transmitting member 58 is configured to transmit turning (rotary movement) of the rotary lever 81 to the intermediate shaft 530. More specifically, when the rotary lever 81 is turned, the rotation-transmitting member 58 is engaged with the projections 815 and rotated together with the intermediate shaft 530.

As shown in FIG. 15, in the present embodiment, the intermediate shaft 530 is rotatably supported by the inner housing 103 via a bearing (specifically, a ball bearing) 583 fixed to the rotation-transmitting member 58. More specifically, a front end part 104 of the inner housing 103 has a circular cylindrical shape. A circular cylindrical holding sleeve 105 is fixed to an upper end portion of the front end part 104. The bearing 583 is disposed between the intermediate shaft 530 and the inner housing 103 such that its inner race is fixed to an outer periphery of the rotation-transmitting member 58 (specifically, a cylindrical portion of the rotation-transmitting member 58 which is fitted onto the intermediate shaft 530) and its outer race is slidable in the up-down direction along an inner peripheral surface of the holding sleeve 105. Therefore, the intermediate shaft 530, the rotation-transmitting member 58 and the bearing 583 can move together in the up-down direction relative to the inner housing 103 and the spindle 3B while the bearing 583 slides along the holding sleeve 105.

Further, as shown in FIGS. 15 and 17, in the present embodiment, the spring-receiving part 37, the clamp spring 59, the spring-receiving part 579 and a thrust bearing 585 are disposed between the spindle 3B (specifically, the bearing 301 whose inner race is fixed to the spindle 3B) and the rotation-transmitting member 58. Like in the first embodiment, the clamp spring 59 is disposed between the spring-receiving parts 37 and 579 in a compressed state and always biases the rotation-transmitting member 58 and the intermediate shaft 530 upward relative to the spindle 3B via the spring-receiving part 579 and the thrust bearing 585. In the present embodiment, a thrust needle bearing is adopted as the thrust bearing 585.

The lock mechanism 6B of the present embodiment is different in the arrangement of the ball-biasing spring 67 from the lock mechanism 6A (see FIGS. 4 and 6) of the first embodiment, but otherwise has substantially the same structure as the lock mechanism 6A. As shown in FIG. 17, in the present embodiment, the ball-biasing spring 67 is disposed in a compressed state between a retaining ring 673 fixed to the intermediate shaft 530 below the spring-receiving part 579 and the shoulder part 634 of the lock sleeve 63, and always biases the lock sleeve 63 downward relative to the intermediate shaft 530.

The structures of the first cam part 330 and the second cam part 550 are now described. As described above, the first and second cam parts 33 and 55 of the first embodiment (see FIG. 9) are configured as a cam mechanism using respective inclined faces (the cam faces 333 and 553). In the present embodiment, however, the first and second cam parts 330 and 550 are configured as a cam mechanism using an inclined groove.

Figure 19:
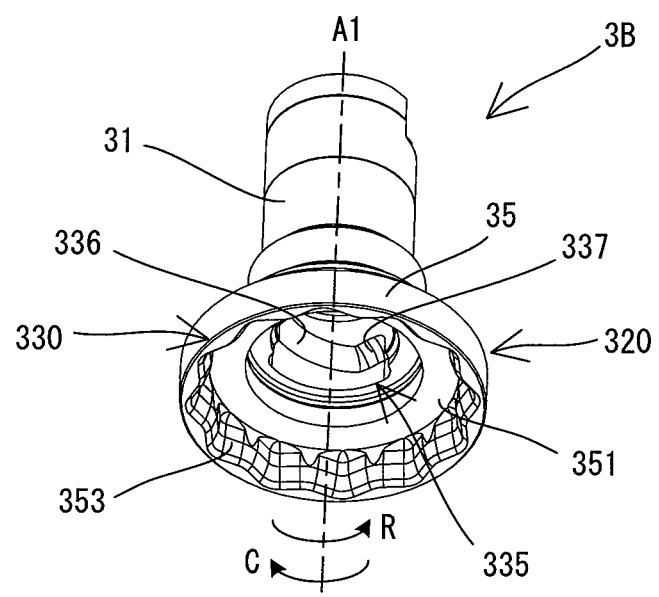
FIG. 19 is a perspective view showing the spindle.
Figure 20:
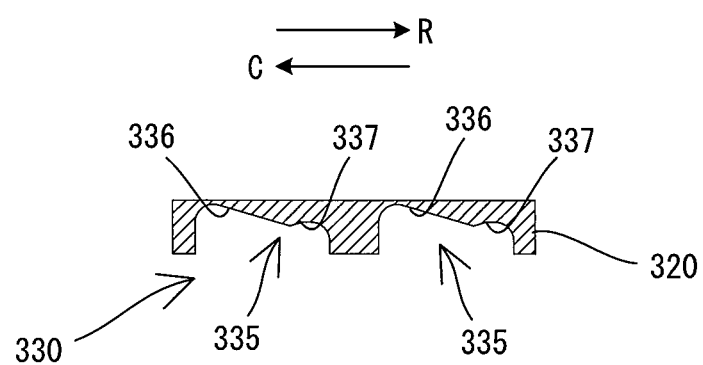
FIG. 20 is a developed view of a first cam part.

More specifically, as shown in FIGS. 17, 19 and 20, the first cam part 330 is provided on an inner side of an upper end portion of the flange part 320 of the spindle 3B. The first cam part 330 is formed by a pair of cam grooves 335 formed on an inner periphery of the flange part 320. The cam grooves 335 are symmetrically arranged relative to the driving axis A1. Each of the cam grooves 335 is an inclined groove inclined in the circumferential direction around the driving axis A1, and is configured to be inclined downward up to a specified boundary and inclined upward from the boundary in the release direction (shown by an arrow R in FIGS. 19 and 20). More specifically, as shown in FIGS. 19 and 20, the cam groove 335 is configured to be inclined downward in the release direction (shown by the arrow R in FIGS. 19 and 20) from an end which is on the side toward the clamp direction (shown by an arrow C in FIGS. 19 and 20), and only an end portion of the cam groove 335 on the side toward the release direction is inclined upward. In the following description, the portion of the cam groove 335 which is inclined downward from the end on the clamp direction side is also referred to as a first inclined part 336, and the other end portion (which is inclined upward) on the release direction side is referred to as a second inclined part 337. The length of the second inclined part 337 in the circumferential direction generally corresponds to the diameter of a ball 555 described below. Specifically, the second inclined part 337 is dimensioned such that the ball 555 can fit within the second inclined part 337.

Although not shown in detail, in the present embodiment, the rotary lever 81 is disposed to be turned from the initial position in a clockwise direction when viewed from above. In other words, when the tool accessory 91 is unclamped, the rotary lever 81 is turned in a direction opposite to the turning direction of the rotary lever 81 in the first embodiment. Therefore, in the present embodiment, the release direction is the clockwise direction and the clamp direction is the counterclockwise direction when viewed from above the rotary lever 81.

As shown in FIGS. 17 and 18, the second cam part 550 is provided on the upper side of the flange part 560 of the intermediate shaft 530. In the present embodiment, the second cam part 550 includes a pair of the balls 555. The balls 555 are symmetrically arranged relative to the driving axis A1. Each of the balls 555 is partially fitted in a recess which is formed in an outer periphery of the intermediate shaft 530 and has a semi-circular section, and the rest of about half of the ball 555 protrudes radially outward of the intermediate shaft 530 from the recess. The portion of the ball 555 which protrudes from the recess has an outer surface (curved surface (spherical surface)) conforming to an inner surface of the cam groove 335 of the first cam part 330. The balls 555 are slidably disposed within the respective cam grooves 335.

By using the first and second cam parts 330 and 550 having the above-described structure, the diameter of the flange part 320 of the spindle 3B in which the first cam part 330 is provided can be made smaller than that in the first embodiment. This is because this structure does not need spaces which are provided on the inner and outer sides of the cam faces 333 and 553 in the radial direction in the structure using the cam faces 333 and 553 (see FIG. 9) which slide contact with each other in the up-down direction. Therefore, in the first embodiment, as shown in FIG. 3, the flange part 32 is disposed on the lower side of the bearing 302, while in the present embodiment, as shown in FIG. 15, an upper end portion of the flange part 320 is supported by the bearing 302. The first cam part 330 is disposed radially inward of the bearing 302. With such an arrangement, the spindle 3B can also be shortened in the up-down direction compared with the spindle 3A of the first embodiment.

The first and second cam parts 330 and 550 are configured to cause the intermediate shaft 530 to move in the up-down direction relative to the spindle 3B when rotating relative to each other while the balls 555 slide within the cam grooves 335. In other words, the first and second cam parts 330 and 550 are a motion-converting mechanism configured to convert rotation of the intermediate shaft 530 around the driving axis A1 relative to the spindle 3B into linear movement of the intermediate shaft 530 in the up-down direction relative to the spindle 3B. Further, as described above, the cam groove 335 includes the first and second inclined parts 336 and 337 which are different in the direction of inclination from each other. Therefore, when the ball 555 crosses over the boundary between the first inclined part 336 and the second inclined part 337, the direction of movement of the intermediate shaft 530 relative to the spindle 3B is reversed.

In the present embodiment, by utilizing the first and second cam parts 330 and 550 as such a motion-converting mechanism, like in the first embodiment, when the rotary lever 81 is turned within a specified angle range from the initial position, the intermediate shaft 530 moves downward while rotating relative to the spindle 3B, so that the clamping force is released and the tool accessory 91 is pushed down. When the rotary lever 81 is further turned beyond the specified angle range, the intermediate shaft 530 rotates relative to the spindle 3B, so that the clamp shaft 510 locked by the lock mechanism 6B is unlocked and allowed to be removed from the spindle 3B.

Operation of the oscillating tool 1B is now described.

As shown in FIG. 15, when the rotary lever 81 is placed in the initial position and the clamp shaft 510 is locked by the lock mechanism 6B, the intermediate shaft 530 is held in the clamp position together with the clamp shaft 510 by the biasing force of the clamp spring 59. At this time, each of the balls 555 is located within the first inclined part 336 (see FIGS. 19 and 20). The head part 515 clamps the tool accessory 91 in cooperation with the tool-mounting part 35 with the clamping force (force of pressing the tool accessory 91 upward against the spindle 3B) applied thereto by the clamp spring 59. When the motor 21 is driven in this state, the spindle 3B is reciprocally rotated and the tool accessory 91 fixed to the spindle 3B is oscillatorily driven.

As described above, in the lock state, each of the balls 61 of the lock mechanism 6B is located within the engagement groove 512 and partially engaged with the recess 517 (see FIG. 16) of the clamp shaft 510 so that the movement of the balls 61 in the circumferential direction is restricted. Therefore, slip of the balls 61 within the engagement groove 512 can be reduced when the spindle 3B is reciprocally rotated. As a result, heat generation due to friction can be reduced.

As described above, in the present embodiment, the rotation-transmitting member 58 is rotatably supported by the inner housing 103 (the front end part 104) via the bearing 583. Generally, the upper and lower end portions of the clamp spring 59 may be ground flat in order to stabilize abutment with a lower surface of the spring-receiving part 579 and an upper surface of the spring-receiving part 37. Due to a grinding error, however, the clamp spring 59, the spring-receiving part 579 and thus the intermediate shaft 530 may tilt. As a countermeasure, by providing the bearing 583 between the intermediate shaft 530 and the inner housing 103 in the radial direction like in the present embodiment, the clamp spring 59, the spring-receiving part 579 and thus the intermediate shaft 530 can be effectively prevented from tilting relative to the driving axis A1 while securing smooth rotation of the intermediate shaft 530, regardless of a grinding error of the clamp spring 59 or the like. Therefore, the oscillating motion of the tool accessory 91 can be stabilized. Further, the bearing 583 closes a gap between the inner housing 103 and the rotation-transmitting member 58, thereby preventing entry of foreign matters such as dust into the inner housing 103.

The user can remove the clamp shaft 510 from the spindle 3B (the intermediate shaft 530) by turning the rotary lever 81 in the release direction from the initial position. While being turned, the rotary lever 81 rotates the intermediate shaft 530 around the driving axis A1 via the rotation-transmitting member 58. At this time, each of the balls 555 slides within the first inclined part 336 which is inclined downward in the release direction, so that the intermediate shaft 530 moves downward against the biasing force of the clamp spring 59 while rotating in the release direction. As a result, the clamping force is released. Further, in the process of the downward movement of the intermediate shaft 530, the lower end surface of the flange part 560 abuts on the tool accessory 91 from above and pushes the tool accessory 91 downward.

In the above-described process, the rotation-transmitting member 58 and the intermediate shaft 530 rotate relative to the clamp spring 59, the spring-receiving part 579 and the spindle 3B. At this time, in the present embodiment, the thrust bearing 585 disposed between the rotation-transmitting member 58 (specifically, the inner race of the bearing 583) and the spring-receiving part 579 can reduce friction between the rotation-transmitting member 58 and the spring-receiving part 579, and thus can realize smooth rotation of the intermediate shaft 530 relative to the spindle 3B.

The lock mechanism 6B is configured to maintain the lock state while the intermediate shaft 530 moves downward while rotating relative to the spindle 3B with the balls 555 located within the respective first inclined parts 336 of the cam grooves 335. In other words, the lock mechanism 6B maintains the lock state while the rotary lever 81 is turned within a specified angle range from the initial position in the release direction. This specified angle range is approximately 90 degrees. While the rotary lever 81 is turned approximately 90 degrees from the initial position, the intermediate shaft 530 moves downward while rotating relative to the spindle 3B until each of the balls 555 reaches the boundary between the first inclined part 336 and the second inclined part 337 of the cam groove 335. Meanwhile, the intermediate shaft 530 also rotates together with the balls 61 relative to the lock sleeve 63, but the balls 61 are held between the clamp shaft 510 and the lock sleeve 63 in their engagement positions (see FIGS. 6 and 11) and the lock mechanism 6B maintains the lock state.

When the rotary lever 81 is turned beyond the position of approximately 90 degrees from the initial position in the release direction, the intermediate shaft 530 further rotates relative to the spindle 3B and each of the balls 555 climbs over the boundary between the first inclined part 336 and the second inclined part 337 of the cam groove 335 (see FIGS. 19 and 20). When the ball 555 enters the second inclined part 337 which is inclined upward in the release direction, the intermediate shaft 530 slightly moves upward while rotating since the intermediate shaft 530 is always biased upward by the clamp spring 59. When the ball 555 abuts on the end of the cam groove 335 on the release direction side, the intermediate shaft 530 is prevented from further rotating.

Further, the balls 61 held by the intermediate shaft 530 face the respective ball-receiving parts 635 and are allowed to move to their retraction positions (see FIG. 8). In other words, the lock mechanism 6B is switched to the unlock state and the clamp shaft 510 is placed in the provisional lock state. Then the user can remove the tool accessory 91 and the clamp shaft 510 from the spindle 3B and the intermediate shaft 530 by pulling down the clamp shaft 510 in the provisional lock state.

As described above, in the present embodiment, the lock mechanism 6B is switched to the unlock state at the timing when each of the balls 555 crosses over the boundary between the first inclined part 336 and the second inclined part 337. The user can sense upward movement of the intermediate shaft 530 via the rotary lever 81 and thus can easily recognize switching of the lock mechanism 6B to the unlock state. Further, in the present embodiment, the second inclined part 337 is configured to be dimensioned such that the ball 555 can just fit therein, so that the intermediate shaft 530 is immediately prevented from rotating when the ball 555 passes over the boundary. Therefore, the user can also recognize switching of the lock mechanism 6B to the unlock state by sensing stop of rotation of the intermediate shaft 530 via the rotary lever 81. Further, since the first and second inclined parts 336 and 337 are inclined in opposite directions to each other in the circumferential direction, the ball 555 cannot move from the second inclined part 337 to the first inclined part 336 unless the ball 555 climbs over the boundary against the biasing force of the clamp spring 59. With this structure, the unlock state of the lock mechanism 6B can be stably maintained.

The operation of mounting the clamp shaft 510 to the spindle 3B (the intermediate shaft 530) and clamping the tool accessory 91 is basically the reverse of the removal operation. Specifically, the user first inserts the clamp shaft 510 into the intermediate shaft 530 so as to provisionally lock the clamp shaft 510, and then turns the rotary lever 81 toward the initial position in the clamp direction. The lock mechanism 6B is switched to the lock state at the timing when each of the balls 555 climbs over the boundary and enters the first inclined part 336. When the user further turns the rotary lever 81 in the clamp direction, the intermediate shaft 530 moves upward while rotating with each of the balls 555 sliding within the first inclined part 336. After the rotary lever 81 is returned to the initial position, the intermediate shaft 530 and the clamp shaft 510 move upward while rotating and return to the clamp position by the biasing force of the clamp spring 59 and the action of the first inclined parts 336. In this process, the thrust bearing 585 can also realize smooth relative rotation of the intermediate shaft 530.

Correspondences between the features of the above-described embodiments and the features of the claimed invention are as follows. However, the features of the embodiments are mere examples and do not limit the features of the present invention. Each of the oscillating tools 1A and 1B is an example of the "work tool". The housing 10 is an example of the "housing". Each of the spindles 3A and 3B is an example of the "spindle". The driving axis A1 is an example of the "driving axis". Each of the clamp shafts 51 and 510 is an example of the "clamp shaft". The shaft part 511 and the head part 515 are examples of the "shaft part" and the "head part", respectively. The clamp spring 59 is an example of the "biasing member". The rotary lever 81 is an example of the "operation member". The first cam part 33 and the second cam part 55 as a whole are an example of the "motion-converting mechanism". Each of the intermediate shafts 53 and 530 (each of the flange parts 56 and 560) is an example of the "pushing-down member". The spring-receiving part 579 is an example of the "release member". Each of the lock mechanisms 6A and 6B is an example of the "lock mechanism". The lower part 54 of each of the intermediate shafts 53 and 530 is an example of the "cylindrical part". The sealing member 39 is an example of the "first sealing member". The elastic member 546 is an example of the "second sealing member". The first cam part 330 and the second cam part 550 as a whole are another example of the "motion-converting mechanism". The first cam part 330 and the second cam part 550 are examples of the "first cam part" and the "second cam part", respectively. The cam groove 335 is an example of the "inclined groove". The ball 555 is an example of the "engagement part". The bearing 583 is an example of the "bearing member". The thrust bearing 585 is an example of the "friction-reducing member".

The above-described embodiments are mere examples, and a work tool according to the present invention is not limited to the structures of the oscillating tools 1A and 1B of the above-described embodiments. For example, the following modifications may be made. Further, one or more of these modifications may be employed in combination with any one of the oscillating tools 1A and 1B of the above-described embodiments and the claimed invention.

The rotary lever 81 may be disposed to be turnable around the driving axis A1 and, for example, its shape, arrangement, support structure and structure of engagement with the intermediate shaft 53 may be appropriately changed.

The structure of the clamp mechanism 5A, 5B (for example, the shapes, arrangement and support structures of the clamp shaft 51, 510, the clamp spring 59 and the intermediate shaft 53, 530, and the components, shape, arrangement and support structure of the lock mechanism 6A, 6B) may be appropriately changed. Examples of adoptable modifications are as follows.

The clamp shaft 51, 510 may be biased upward relative to the spindle 3A, 3B, not via the intermediate shaft 53, 530, but directly by the clamp spring 59 or other biasing member. Further, the clamp shaft 51, 510 may be unremovable from the spindle 3A, 3B if only the clamp shaft 51, 510 is always biased upward and supported so as to be movable relative to the spindle 3A, 3B in the up-down direction. In this case, the lock mechanism 6A, 6B may be omitted. In place of the clamp spring 59, for example, a tension coil spring, a torsion spring, a disc spring or a rubber spring may be adopted.

In the above-described embodiment, the intermediate shaft 53, 530 is configured to exhibit a plurality of functions (including the functions of pushing down the tool accessory 91 along with turning of the rotary lever 81 in the release direction, converting rotation of the intermediate shaft 53, 530 around the driving axis A1 into linear movement in the up-down direction in cooperation with the first cam part 33, 330 of the spindle 3A, 3B, holding the clamp shaft 51, 510 via the balls 61, switching the lock mechanism 6A, 6B between the lock state and the unlock state, and receiving the biasing force of the clamp spring 59). However, the intermediate shaft 53, 530 need not exhibit all of these functions. Further, these functions may be realized by a plurality of members.

For example, the intermediate shaft 53, 530 (specifically, the flange part 56, 560) may have only the function of pushing down the tool accessory 91 along with turning of the rotary lever 81 in the release direction. Further, the shape of the flange part 56, 560 may be appropriately changed, but in order to more reliably eliminate a stuck state of the tool accessory 91, it may be preferable that the flange part 56, 560 and the tool accessory 91 are configured to come into contact with each other at plurality of points around the clamp shaft 51, more preferably into contact with each other so as to encircle the clamp shaft 51 in the circumferential direction, further more preferably into surface contact with each other. Further, for example, the spring-receiving part 579 may be pushed downward independently from the intermediate shaft 53, 530 along with turning of the rotary lever 81 in the release direction, so that the force of biasing the clamp shaft 51, 510 (the intermediate shaft 53, 530) upward is released.

In the second embodiment, the bearing 583 disposed between the intermediate shaft 530 (the rotation-transmitting member 58) and the inner housing 103 may be changed to a bearing other than the ball bearing (for example, a bearing of a different type such as a rolling bearing and a sliding bearing), or it may be omitted.

In the second embodiment, the thrust bearing 585 disposed between the rotation-transmitting member 58 and the spring-receiving part 579 may be changed to a thrust bearing other than the needle bearing (for example, a thrust bearing of a different type such as a thrust rolling bearing), or it may be omitted. Further, in place of the thrust bearing 585, a member (such as a thrust washer) may be disposed which is capable of reducing friction between the rotation-transmitting member 58 and the spring-receiving part 579 and realizing smooth rotation of the rotation-transmitting member 58 relative to the spring-receiving part 579. In a case where the clamp spring 59 rotates together with the rotation-transmitting member 58, the thrust bearing 585 (or other bearing or friction-reducing member) may be disposed not between the rotation-transmitting member 58 and the spring-receiving part 579, but between the spring-receiving part 37 and the spindle 3B (the inner race of the bearing 301).

In the above-described embodiments, as examples of the motion-converting mechanism which moves the intermediate shaft 53, 530 in the up-down direction along with turning of the rotary lever 81 around the driving axis A1, the first and second cam parts 33 and 55 formed as a cam mechanism using respective inclined faces and the first and second cam parts 330 and 550 formed as a cam mechanism using an inclined groove are explained. However, such a motion-converting mechanism may be appropriately changed or modified.

For example, although the first and second cam parts 33 and 55 respectively have the inclined cam faces 333 and 553, only either one of them may have an inclined face. Further, in place of the orthogonal faces 332 and 552, the first and second cam parts 33 and 55 may have inclined faces which are inclined in a direction opposite to the direction of inclination of the cam faces 333 and 553, respectively. Contrary to the second embodiment, the second cam part 550 may have an inclined groove and the first cam part 330 may have an engagement part (for example, a ball or a protrusion) which has a curved surface conforming to a portion of the inclined groove and engages with the inclined groove. The length of the second inclined part 337 of the cam groove 335 may be larger than the diameter of the ball 555. A groove which extends in the circumferential direction on a plane orthogonal to the driving axis A1 may be further connected to an end of the second inclined part 337 on the release direction side. The cam groove 335 (inclined groove) may have only the first inclined part 336 which is inclined downward in the release direction. A cam mechanism using a spiral groove or a screw mechanism using a screw groove may be adopted. Further, the motion-converting mechanism need not be provided on the spindle 3A, 3B and the intermediate shaft 53, 530 as in the above-described embodiments. For example, the first cam part 33, 330 may be provided in the housing 10 (the inner housing 103), while the second cam part 55, 550 may be provided in the upper end portion of the intermediate shaft 53, 530.

The motion-converting mechanism may convert turning movement of the rotary lever 81 into movement of the intermediate shaft 53, 530 in the up-down direction, directly or via a different member. For example, a spiral inclined groove may be formed in an upper end portion of the rotation-transmitting member 576 and the projection 815 may slide within the inclined groove along with turning of the rotary lever 81, so that the intermediate shaft 53, 530 is moved in the up-down direction. Further, an intervening member may be disposed between the rotary lever 81 and the intermediate shaft 53, 530 and configured to move in the up-down direction while being rotated by engagement with the rotary lever 81. Then, the intermediate shaft 53, 530 may be moved in the up-down direction by the intervening member.

In the above-described embodiments, the lock mechanism 6A, 6B is configured to lock the clamp shaft 51, 510 by using the three balls 61 held by the lock sleeve 63, but the number of the balls 61 is not limited to three. Further, in the above-described embodiments, the lock sleeve 63 cannot rotate relative to the spindle 3A, 3B, and the balls 61 and the lock sleeve 63 move in the circumferential direction relative to each other by rotation of the intermediate shaft 53, 530, so that the lock mechanism 6A, 6B is switched between the lock state and the unlock state. However, the intermediate shaft 53, 530 may be configured to move only in the up-down direction relative to the spindle 3A, 3B, and the lock sleeve 63 may be configured to rotate relative to the spindle 3A, 3B along with turning of the rotary lever 81. The direction of movement of the balls 61 and the lock sleeve 63 relative to each other may be not the circumferential direction but the up-down direction. Further, a plurality of clamp members each having a plurality of teeth may be adopted in place of the balls 61. In this case, the clamp shaft 51, 510 may have a plurality of grooves formed to be engaged with the teeth of the clamp members. The clamp members may be held so as to be movable in the radial direction, for example, by an annular collar. Further, the lock mechanism 6A, 6B may be disposed not on the upper side of the spindle 3A, 3B but, for example, in the inside of the spindle 3A, 3B.

The structure in which the lock mechanism 6A, 6B provisionally holds the clamp shaft 51 in the unlock state may be appropriately changed. For example, an elastic member (such as a spring and an O-ring) which directly biases the balls 61 (or the clamp members) radially inward may be adopted, in place of the structure in which the lock sleeve 63 is biased downward by the ball-biasing spring 67 so as to indirectly bias the balls 61 in the radial direction in the unlock state.

The structure (for example, the shape and support structure) of the spindle 3A, 3B is not limited to the above-described embodiments, but may be appropriately changed or modified. For example, in the above-described embodiments, the tool-mounting part 35 has the recess 351 which corresponds to the protruding part 911 of the tool accessory 91, and the tool accessory 91 may be fixed to the tool-mounting part 35 with the inclined face 913 in abutment with the inclined face 353 of the tool-mounting part 35. However, the tool-mounting part 35 may have a planar lower surface and be configured such that the tool accessory 91 having a planar upper surface may be fixed thereto. In this case, the tool-mounting part 35 and the tool accessory 91 may be respectively provided with a projection and a fitting hole for positioning the tool accessory 91 onto the tool-mounting part 35. In this case, like the inclined faces 353, 913 of the above-described embodiments, the projection and the fitting hole may have respective inclined faces which are inclined relative to the driving axis A1 and conform to each other.

The structures of the housing 10, the motor 21 and the transmitting mechanism 4 (for example, their shapes, internal structures to be housed and arrangements) may also be appropriately changed. For example, the housing 10 need not be a vibration-isolating housing including the outer housing 101 and the inner housing 103 which are elastically connected to each other, and may be a housing having a single layer structure. Further, for example, the motor 21 may be an alternate current motor. The motor 21 may be housed within the grip part 15 such that the rotation axis A2 of the output shaft 211 extends perpendicularly to the driving axis A1.

Further, in view of the nature of the present invention, the above-described embodiments and their modifications, the following features are provided. Each of the features can be employed independently or in combination with any of the oscillating tools 1A, 1B of the above-described embodiments, the above-described modifications and the claimed invention.

(Aspect 1)

The first cam part comprises the inclined groove, the second cam part comprises a ball or a protrusion which has a curved surface conforming to an inner surface of the inclined groove, and a portion of the inclined face or the inclined groove which is inclined upward in the first direction has a size substantially corresponding to the ball or the protrusion.

The ball 555 of the above-described embodiment is an example of the "ball" according to the present aspect.

(Aspect 2)

The lock mechanism is configured to be held in the first state while the second cam part slides along a portion of the inclined face or the inclined groove which is inclined downward in the first direction along with turning of the operation member in the first direction and to be switched to the second state when the second cam part crosses over the boundary.

(Aspect 3)

The pushing-down member is at least partly disposed between the clamp shaft and the spindle in a radial direction relative to the driving axis, and the motion-converting mechanism includes a first part provided on an inner peripheral portion of the spindle and a second part provided on an outer peripheral portion of the pushing-down member.

Each of the first cam parts 33, 330 is an example of the "first part" according to the present aspect, and each of the second cam parts 55, 550 is an example of the "second part" according to the present aspect.

(Aspect 4)

The motion-converting mechanism is a cam mechanism using an inclined face or an inclined groove, or a screw mechanism using a screw groove, and the motion-converting mechanism includes a first part provided on the housing or the spindle and a second part provided on the pushing-down member.

The first cam part 33 and the second cam part 55 of the first embodiment are an example of the "cam mechanism" according to the present aspect and are examples of the "first part" and the "second part", respectively, according to the present aspect. The first cam part 330 and the second cam part 550 of the second embodiment are another example of the "cam mechanism" according to the present aspect and are examples that correspond to the "first part" and the "second part", respectively, according to the present aspect.

(Aspect 5)

The motion-converting mechanism includes a first cam part and a second cam part, the first cam part being provided on the housing or the spindle and having a first abutting face, the second cam part being provided on the pushing-down member and having a second abutting face, at least one of the first and second abutting faces includes an inclined face which is inclined in a circumferential direction around the driving axis, and the first and second cam parts are disposed to be rotatable around the driving axis relative to each other and configured to convert rotation of the pushing-down member relative to the spindle into linear movement of the pushing-down member in the up-down direction by sliding movement of the first abutting face and the second abutting face relative to each other.

The first cam part 33 and the second cam part 55 of the above-described embodiment are examples of the "first cam part" and the "second cam part", respectively, according to the present aspect. A lower surface of the first cam part 33 and an upper surface of the second cam part 55 are examples of the "first abutting face" and the "second abutting face", respectively, according to the present aspect.

(Aspect 6)

The motion-converting mechanism includes a first cam part and a second cam part, the first cam part being provided on the housing or the spindle and having a first abutting face, the second cam part being provided on the pushing-down member and having a second abutting face, the first abutting face includes a first inclined face and a first orthogonal face, the first inclined face being inclined in a circumferential direction around the driving axis and the first orthogonal face being orthogonal to the driving axis, the second abutting face includes a second inclined face and a second orthogonal face, the second inclined face being inclined in the circumferential direction and conforming to the first inclined face, the second orthogonal face being orthogonal to the driving axis, and the first cam part and the second cam part are disposed to be rotatable around the driving axis relative to each other, and the first cam part and the second cam part are configured:
to convert rotation of the pushing-down member into the linear movement by sliding movement of the first inclined face and the second inclined face relative to each other when the operation member is turned within a specified angle range from a reference position in the first direction, and
to allow the pushing-down member to rotate by sliding movement of the first orthogonal face and the second orthogonal face relative to each other without converting rotation of the pushing-down member into the linear movement when the operation member is turned beyond the specified angle range in the first direction.

The first cam part 33 and the second cam part 55 of the above-described embodiment are examples of the "first cam part" and the "second cam part", respectively, according to the present aspect. A lower surface of the first cam part 33 and an upper surface of the second cam part 55 are examples of the "first abutting face" and the "second abutting face", respectively, according to the present aspect. The cam face 333 and the orthogonal face 332 are examples of the "first inclined face" and the "first orthogonal face", respectively, according to the present aspect. The cam face 553 and the orthogonal face 552 are examples of the "second inclined face" and the "second orthogonal face", respectively, according to the present aspect.

(Aspect 7)

The lock mechanism includes:
an engagement member configured to engage with the clamp shaft, the engagement member being movable in a radial direction between a first position in which the engagement member is engageable with the clamp shaft and a second position in which the engagement member is not engageable with the clamp shaft, and
a holding member configured to be rotatable together with the spindle, the holding member being movable relative to the engagement member between a third position in which the holding member immovably holding the engagement member in the first position and a fourth position in which the holding member holding the engagement member to be movable from the first position to the second position.

The ball 61 and the lock sleeve 63 of the above-described embodiment are examples of the "engagement member" and the "holding member", respectively, according to the present aspect.

(Aspect 8)

The holding member is configured to be relatively moved from the third position to the fourth position when the operation member is turned in the first direction.

(Aspect 9)

The engagement member and the holding member are configured to move in a circumferential direction around the driving axis relative to each other.

(Aspect 10)

The engagement member and the holding member are configured to move in a circumferential direction around the driving axis relative to each other along with rotation of the pushing-down member.

(Aspect 11)

The lock mechanism includes a second biasing member which biases the engagement member or the holding member, and the engagement member is configured:
to be biased in the first direction by a biasing force of the second biasing member and engaged with the clamp shaft when the holding member is located in the fourth position, and
to be moved to the second position against the biasing force by the clamp shaft and disengaged from the clamp shaft when the clamp shaft is moved in a direction to be removed from the spindle.

The ball-biasing spring 67 of the above-described embodiment is an example of the "second biasing member" according to the present aspect.

(Aspect 12)

The release member is configured to release the clamping force by moving downward against the biasing force.

(Aspect 13)

The release member is configured to move in the up-down direction together with the pushing-down member.

(Aspect 14)

The spindle has a lower end portion having a first inclined face which is inclined in a direction crossing the driving axis, and the clamp shaft is configured to clamp the tool accessory between the head part and the lower end portion of the spindle while pressing a second inclined face of the tool accessory against the first inclined face from below with the clamping force applied thereto by the biasing member.

(Aspect 15)

A work tool configured to perform a processing operation on a workpiece by driving a tool accessory in an oscillating manner, the work tool comprising:
a housing;
a cylindrical spindle supported by the housing so as to be rotatable around a driving axis, the driving axis defining an up-down direction of the work tool;
a clamp shaft configured to be movable in the up-down direction relative to the spindle and having a shaft part and a head part, the shaft part extending coaxially with the spindle within the spindle, the head part being connected to a lower end of the shaft part;
a biasing member configured to bias the clamp shaft upward relative to the spindle so as to apply to the clamp shaft a clamping force for clamping the tool accessory between the head part and a lower end part of the spindle;
a lock mechanism disposed within the housing and configured to lock the clamp shaft so as not to allow the clamp shaft to be removed from the spindle;
a release member configured to release the clamping force against a biasing force of the biasing member; and
an operation member configured to be turned around the driving axis by a user's external operation, wherein:
the lock mechanism is configured to unlock the clamp shaft along with turning of the operation member in a first direction, and
the release member is configured to release the clamping force along with turning of the operation member in the first direction.

According to the present aspect, the user can cause the work tool to perform both the operation of unlocking the clamp shaft and the operation of releasing the clamping force simply by a single operation of turning the operation member in the first direction.

(Aspect 16)

The work tool as defined in Aspect 15, wherein:

the release member is configured to release the clamping force along with turning of the operation member in the first direction within a specified angle range from a reference position, and the lock mechanism is configured to unlock the clamp shaft along with turning of the operation member beyond the specified angle range in the first direction.

According to the present aspect, the clamping force can be released while the user turns the operation member by the specified angle from the reference position in the first direction. Thereafter, when the user further turns the operation member beyond the specified angle in the first direction, the clamp shaft can be unlocked and allowed to be removed. The user can cause the work tool to perform an efficient series of the operations of unlocking the clamp shaft after releasing the clamping force simply by a single operation of turning the operation member from the reference position beyond the specified angle range in the first direction.

DESCRIPTION OF THE NUMERALS 1A, 1B: oscillating tool, 10: housing, 101: outer housing, 103: inner housing, 11: front end part, 13: rear end part, 131: battery-mounting part, 15: grip part, 20: controller, 21: motor, 211: output shaft, 27: slider, 28: speed change dial, 29: switch, 3A, 3B: spindle, 301: bearing, 302: bearing, 31: cylindrical part, 32: flange part, 33, 330: first cam part, 331: protrusion, 332: orthogonal face, 333: cam face, 335: cam groove, 35: tool-mounting part, 351: recess, 353: inclined face, 37: spring-receiving part, 371: recess, 39: sealing member, 4: transmitting mechanism, 41: eccentric shaft, 43: oscillating arm, 45: bearing, 5A, 5B: clamp mechanism, 51, 510: clamp shaft, 511: shaft part, 512: engagement groove, 513: elastic member, 515: head part, 53, 530: intermediate shaft, 54, 540: lower part, 541: lock part, 542: ball-holding hole, 545: sliding part, 546: elastic member, 55, 550: second cam part, 551: protrusion, 552: orthogonal face, 553: cam face, 555: ball, 56: flange part, 57: upper part, 571: male-thread part, 572: nut, 573: fitting hole, 574: pin, 576, 58: rotation-transmitting member, 577: recess, 579: spring-receiving part, 59: clamp spring, 6A, 6B: lock mechanism, 61: ball, 63: lock sleeve, 631: sliding part, 633: ball-holding part, 634: shoulder part, 635: ball-receiving part, 638: locking projection, 67: ball-biasing spring, 69: washer, 81: rotary lever, 811: fixed part, 813: lever part, 815: projection, 91: tool accessory, 911: protruding part, 912: through hole, 913: inclined face, 93: battery, A1: driving axis, A2: rotation axis

What is claimed is:

1. A work tool configured to perform a processing operation on a workpiece by driving a tool accessory in an oscillating manner, the work tool comprising:

a housing;

a cylindrical spindle supported by the housing so as to be rotatable around a driving axis, the driving axis defining an up-down direction of the work tool;

a clamp shaft configured to be movable in the up-down direction relative to the spindle and having a shaft part and a head part, the shaft part extending coaxially with the spindle within the spindle, the head part being connected to a lower end of the shaft part;

a biasing member configured to bias the clamp shaft upward relative to the spindle so as to apply to the clamp shaft a clamping force for clamping the tool accessory between the head part and a lower end portion of the spindle;

an operation member configured to be turned around the driving axis by a user's external operation;

a motion-converting mechanism configured to convert rotational motion around the driving axis into linear motion along the driving axis; and a pushing-down member disposed to be movable at least in the up-down direction relative to the spindle, wherein:

the motion-converting mechanism is configured to move the pushing-down member in the up-down direction along with turning of the operation member around the driving axis, and the pushing-down member is configured to be moved downward so as to push the tool accessory downward when the operation member is turned in a first direction.

2. The work tool as defined in claim 1, further comprising:

a release member configured to release the clamping force against a biasing force of the biasing member, along with turning of the operation member in the first direction, wherein:

the pushing-down member is configured to push the tool accessory downward in a state in which the clamping force is released by the release member.

3. The work tool as defined in claim 1, further comprising:

a lock mechanism disposed within the housing, wherein:

the clamp shaft is removable from the spindle, and the lock mechanism is configured to lock the clamp shaft so as not to allow the clamp shaft to be removed from the spindle.

4. The work tool as defined in claim 3, further comprising:

a release member configured to release the clamping force against a biasing force of the biasing member, along with turning of the operation member in the first direction, wherein:

releasing the clamping force by the release member, pushing down the tool accessory by the pushing-down member and unlocking the clamp shaft by the lock mechanism are sequentially performed along with turning of the operation member in the first direction.

5. The work tool as defined in claim 4, wherein:

the release member is configured to release the clamping force along with turning of the operation member in the first direction within a specified angle range from a reference position, the motion-converting mechanism is configured to move the pushing-down member downward along with turning of the operation member within the angle range from the reference position in the first direction, and the lock mechanism is configured to unlock the clamp shaft along with turning of the operation member beyond the angle range in the first direction.

6. The work tool as defined in claim 3, wherein the lock mechanism is configured to provisionally hold the clamp shaft when the clamp shaft is unlocked.

7. The work tool as defined in claim 3, wherein:

the pushing-down member is supported by the housing via the spindle, and the lock mechanism is configured to lock the clamp shaft by fixing the clamp shaft to the pushing-down member.

8. The work tool as defined in claim 7, wherein:
the biasing member biases the pushing-down member upward relative to the spindle and is configured to bias the clamp shaft fixed to the pushing-down member by the lock mechanism, upward via the pushing-down member.

9. The work tool as defined in claim 1, wherein:
the operation member is configured to rotate the pushing-down member around the driving axis relative to the spindle while being turned, and
the motion-converting mechanism is configured to convert rotation of the pushing-down member into linear movement of the pushing-down member in the up-down direction.

10. The work tool as defined in claim 9, wherein:
the pushing-down member is an elongate member inserted through the spindle and extending in the up-down direction, and is configured to push down the tool accessory by a lower end thereof, and
the operation member is configured to engage with an upper end portion of the pushing-down member and rotate the pushing-down member.

11. The work tool as defined in claim 9, further comprising:
a lock mechanism disposed within the housing, wherein:
the clamp shaft is removable from the spindle, and
the lock mechanism is configured to be switched between a first state in which the clamp shaft is locked so as not to be removed from the spindle and a second state in which the clamp shaft is unlocked, along with rotation of the pushing-down member.

12. The work tool as defined in claim 1, further comprising:
a first sealing member, wherein:
the pushing-down member includes a cylindrical part disposed coaxially with the spindle between the spindle and the shaft part in a radial direction of the spindle, and
the first sealing member is disposed between the cylindrical part and the spindle.

13. The work tool as defined in claim 12, further comprising:
a second sealing member disposed between the cylindrical part and the spindle on an upper side of the first sealing member, wherein:
the motion-converting mechanism is a cam mechanism that includes a first part provided on the spindle and a second part provided on the cylindrical part, and
the motion-converting mechanism is disposed between the first sealing member and the second sealing member in the up-down direction.

14. The work tool as defined in claim 1, wherein the motion-converting mechanism is a cam mechanism that includes a first cam part having an inclined groove inclined in a circumferential direction around the driving axis and a second cam part having an engagement part, the engagement part having a curved surface conforming to a portion of the inclined groove and being configured to be slidable within the inclined groove.

15. The work tool as defined in claim 1, wherein:
the operation member is configured to rotate the pushing-down member around the driving axis relative to the spindle while being turned,
the motion-converting mechanism is a cam mechanism using an inclined surface or an inclined groove inclined in a circumferential direction around the driving axis and is configured to convert rotation of the pushing-down member into linear movement of the pushing-down member in the up-down direction, and
the inclined surface or the inclined groove is inclined downward up to a specified boundary and inclined upward from the boundary, in the first direction.

16. The work tool as defined in claim 15, wherein:
the cam mechanism includes a first cam part having the inclined face or the inclined groove and a second cam part configured to be slidable along the inclined face or the inclined groove,
the pushing-down member is configured to move downward while rotating while the second cam part slides along a portion of the inclined face or the inclined groove which is inclined downward in the first direction along with turning of the operation member in the first direction and to move upward while rotating when the second cam part crosses over the boundary.

17. The work tool as defined in claim 1, further comprising:
a bearing member, wherein:
the pushing-down member is inserted through the spindle and configured to reciprocally rotate around the driving axis together with the spindle when the tool accessory is driven in the oscillating manner, and
the bearing member is disposed between the housing and the pushing-down member in a radial direction relative to the driving axis.

18. The work tool as defined in claim 1, further comprising:
a friction-reducing member, wherein:
the operation member is configured to rotate the pushing-down member around the driving axis relative to the spindle while being turned,
the biasing member extends in the up-down direction and biases the spindle and the pushing-down member apart from each other in the up-down direction, and
the friction-reducing member is disposed between an upper end or lower end of the biasing member and the spindle or the pushing-down member.

19. The work tool as defined in claim 1, wherein the pushing-down member abuts on the tool accessory from above and pushes the tool accessory down while the pushing-down member moves linearly downward.

20. The work tool as defined in claim 1, wherein:
the spindle has a lower end portion having a first inclined face inclined in a direction crossing the driving axis, and
the clamp shaft is configured to clamp the tool accessory between the head part and the lower end portion of the spindle while pressing a second inclined face of the tool accessory against the first inclined face from below with the clamping force applied thereto by the biasing member.

* * * * *